US012675268B1

(12) United States Patent
Hanebutte et al.

(10) Patent No.: US 12,675,268 B1
(45) Date of Patent: Jul. 7, 2026

(54) METHOD AND SYSTEM FOR GRAPH MANIPULATIONS FOR MACHINE LEARNING INFERENCE ENGINE

(71) Applicant: Marvell Asia Pte Ltd, Singapore (SG)

(72) Inventors: Ulf Hanebutte, Gig Harbor, WA (US); Senad Durakovic, Palo Alto, CA (US); Chien-Chun Chou, Morgan Hill, CA (US); Chia-Hsin Chen, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 433 days.

(21) Appl. No.: 18/143,327

(22) Filed: May 4, 2023

Related U.S. Application Data

(63) Continuation of application No. 18/121,790, filed on Mar. 15, 2023.

(60) Provisional application No. 63/339,709, filed on May 9, 2022.

(51) Int. Cl.
*G06F 8/41* (2018.01)
*G06V 10/82* (2022.01)

(52) U.S. Cl.
CPC .............. *G06F 8/447* (2013.01); *G06V 10/82* (2022.01)

(58) Field of Classification Search
CPC .. G06F 8/47; G06F 8/447; G06F 8/45; G06V 10/82
See application file for complete search history.

(56) References Cited

U.S. PATENT DOCUMENTS

| | | | |
|---|---|---|---|
| 11,210,586 B1 | 12/2021 | Duong et al. | |
| 2021/0073585 A1* | 3/2021 | Chuang ................... | G06V 10/82 |
| 2021/0133583 A1 | 5/2021 | Chetlur et al. | |
| 2021/0279557 A1 | 9/2021 | Febbo et al. | |
| 2021/0343019 A1* | 11/2021 | Diego Andilla ....... | G06N 3/084 |
| 2022/0108155 A1 | 4/2022 | Abdulla et al. | |
| 2024/0054081 A1* | 2/2024 | Blixt ................... | G06F 15/7867 |

* cited by examiner

*Primary Examiner* — Duy Khuong T Nguyen

(57) ABSTRACT

An image is received/divided into a first/second slices, at a first convolutional layer in a CNN. A first/second tensor data for a second/third convolutional layer are generated for the first slice respectively using a kernel. The first tensor data is divided into a first/second portions. The second portion is needed by the second convolutional layer of the second slice to complement partial tensor data generated by the second slice. The second tensor data is divided into a first/second portions where the second portion is needed by the third convolutional layer of the second slice to complement partial tensor data generated by the second slice. The first/second/third convolutional layers of the first slice are processed using a subset of processing tiles. The second portion of the first tensor data and the second portion of the second tensor data generated by the first slice are stored in a memory component.

20 Claims, 30 Drawing Sheets

200A

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ | $a_{17}$ | $a_{18}$ | $a_{19}$ | $a_{20}$ | $a_{21}$ | $a_{22}$ | $a_{23}$ | $a_{24}$ | $a_{25}$ | $a_{26}$ | $a_{27}$ | $a_{28}$ | $a_{29}$ | $a_{30}$ | $a_{31}$ |
|---|---|---|---|---|---|---|---|---|---|---|---|---|---|---|---|---|---|---|---|---|---|---|---|---|---|---|---|---|---|---|
| $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ | $b_{18}$ | $b_{19}$ | $b_{20}$ | $b_{21}$ | $b_{22}$ | $b_{23}$ | $b_{24}$ | $b_{25}$ | $b_{26}$ | $b_{27}$ | $b_{28}$ | $b_{29}$ | $b_{30}$ | $b_{31}$ |
| $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ | $c_{21}$ | $c_{22}$ | $c_{23}$ | $c_{24}$ | $c_{25}$ | $c_{26}$ | $c_{27}$ | $c_{28}$ | $c_{29}$ | $c_{30}$ | $c_{31}$ |
| $d_1$ | $d_2$ | $d_3$ | $d_4$ | $d_5$ | $d_6$ | $d_7$ | $d_8$ | $d_9$ | $d_{10}$ | $d_{11}$ | $d_{12}$ | $d_{13}$ | $d_{14}$ | $d_{15}$ | $d_{16}$ | $d_{17}$ | $d_{18}$ | $d_{19}$ | $d_{20}$ | $d_{21}$ | $d_{22}$ | $d_{23}$ | $d_{24}$ | $d_{25}$ | $d_{26}$ | $d_{27}$ | $d_{28}$ | $d_{29}$ | $d_{30}$ | $d_{31}$ |
| $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | $e_{14}$ | $e_{15}$ | $e_{16}$ | $e_{17}$ | $e_{18}$ | $e_{19}$ | $e_{20}$ | $e_{21}$ | $e_{22}$ | $e_{23}$ | $e_{24}$ | $e_{25}$ | $e_{26}$ | $e_{27}$ | $e_{28}$ | $e_{29}$ | $e_{30}$ | $e_{31}$ |
| $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ | $f_{20}$ | $f_{21}$ | $f_{22}$ | $f_{23}$ | $f_{24}$ | $f_{25}$ | $f_{26}$ | $f_{27}$ | $f_{28}$ | $f_{29}$ | $f_{30}$ | $f_{31}$ |
| $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | $g_{14}$ | $g_{15}$ | $g_{16}$ | $g_{17}$ | $g_{18}$ | $g_{19}$ | $g_{20}$ | $g_{21}$ | $g_{22}$ | $g_{23}$ | $g_{24}$ | $g_{25}$ | $g_{26}$ | $g_{27}$ | $g_{28}$ | $g_{29}$ | $g_{30}$ | $g_{31}$ |
| $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | $h_{14}$ | $h_{15}$ | $h_{16}$ | $h_{17}$ | $h_{18}$ | $h_{19}$ | $h_{20}$ | $h_{21}$ | $h_{22}$ | $h_{23}$ | $h_{24}$ | $h_{25}$ | $h_{26}$ | $h_{27}$ | $h_{28}$ | $h_{29}$ | $h_{30}$ | $h_{31}$ |
| $i_1$ | $i_2$ | $i_3$ | $i_4$ | $i_5$ | $i_6$ | $i_7$ | $i_8$ | $i_9$ | $i_{10}$ | $i_{11}$ | $i_{12}$ | $i_{13}$ | $i_{14}$ | $i_{15}$ | $i_{16}$ | $i_{17}$ | $i_{18}$ | $i_{19}$ | $i_{20}$ | $i_{21}$ | $i_{22}$ | $i_{23}$ | $i_{24}$ | $i_{25}$ | $i_{26}$ | $i_{27}$ | $i_{28}$ | $i_{29}$ | $i_{30}$ | $i_{31}$ |
| $j_1$ | $j_2$ | $j_3$ | $j_4$ | $j_5$ | $j_6$ | $j_7$ | $j_8$ | $j_9$ | $j_{10}$ | $j_{11}$ | $j_{12}$ | $j_{13}$ | $j_{14}$ | $j_{15}$ | $j_{16}$ | $j_{17}$ | $j_{18}$ | $j_{19}$ | $j_{20}$ | $j_{21}$ | $j_{22}$ | $j_{23}$ | $j_{24}$ | $j_{25}$ | $j_{26}$ | $j_{27}$ | $j_{28}$ | $j_{29}$ | $j_{30}$ | $j_{31}$ |
| $k_1$ | $k_2$ | $k_3$ | $k_4$ | $k_5$ | $k_6$ | $k_7$ | $k_8$ | $k_9$ | $k_{10}$ | $k_{11}$ | $k_{12}$ | $k_{13}$ | $k_{14}$ | $k_{15}$ | $k_{16}$ | $k_{17}$ | $k_{18}$ | $k_{19}$ | $k_{20}$ | $k_{21}$ | $k_{22}$ | $k_{23}$ | $k_{24}$ | $k_{25}$ | $k_{26}$ | $k_{27}$ | $k_{28}$ | $k_{29}$ | $k_{30}$ | $k_{31}$ |

| $o_1$ | $o_2$ | $o_3$ | $o_4$ | $o_5$ | $o_6$ | $o_7$ | $o_8$ | $o_9$ | $o_{10}$ | $o_{11}$ | $o_{12}$ | $o_{13}$ | $o_{14}$ | $o_{15}$ | $o_{16}$ |
|---|---|---|---|---|---|---|---|---|---|---|---|---|---|---|---|
| $q_1$ | $q_2$ | $q_3$ | $q_4$ | $q_5$ | $q_6$ | $q_7$ | $q_8$ | $q_9$ | $q_{10}$ | $q_{11}$ | $q_{12}$ | $q_{13}$ | $q_{14}$ | $q_{15}$ | $q_{16}$ |
| $r_1$ | $r_2$ | $r_3$ | $r_4$ | $r_5$ | $r_6$ | $r_7$ | $r_8$ | $r_9$ | $r_{10}$ | $r_{11}$ | $r_{12}$ | $r_{13}$ | $r_{14}$ | $r_{15}$ | $r_{16}$ |
| $s_1$ | $s_2$ | $s_3$ | $s_4$ | $s_5$ | $s_6$ | $s_7$ | $s_8$ | $s_9$ | $s_{10}$ | $s_{11}$ | $s_{12}$ | $s_{13}$ | $s_{14}$ | $s_{15}$ | $s_{16}$ |
| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
| $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | $u_{16}$ |

FIGURE 2C

| $l_1$ | $l_2$ | $l_3$ | $l_4$ | $l_5$ | $l_6$ | $l_7$ | $l_8$ |
|---|---|---|---|---|---|---|---|
| $m_1$ | $m_2$ | $m_3$ | $m_4$ | $m_5$ | $m_6$ | $m_7$ | $m_8$ |
| $n_1$ | $n_2$ | $n_3$ | $n_4$ | $n_5$ | $n_6$ | $n_7$ | $n_8$ |

FIGURE 2D

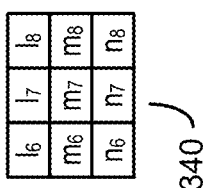
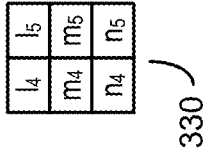
FIGURE 3A
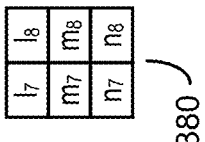
FIGURE 3B

Slice 2

Overlap Region 599

522

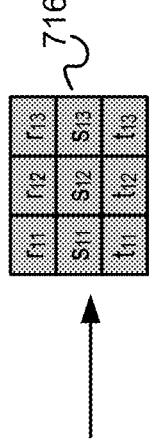
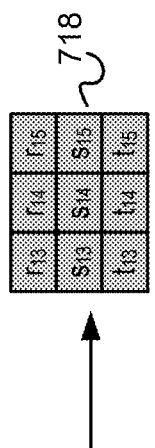
FIGURE 7D
FIGURE 7E
FIGURE 7F

Slice 4

Overlap Region 799

Cone of Influence 888

Cone of Influence 886

Cone of Influence 884

Cone of Influence 882

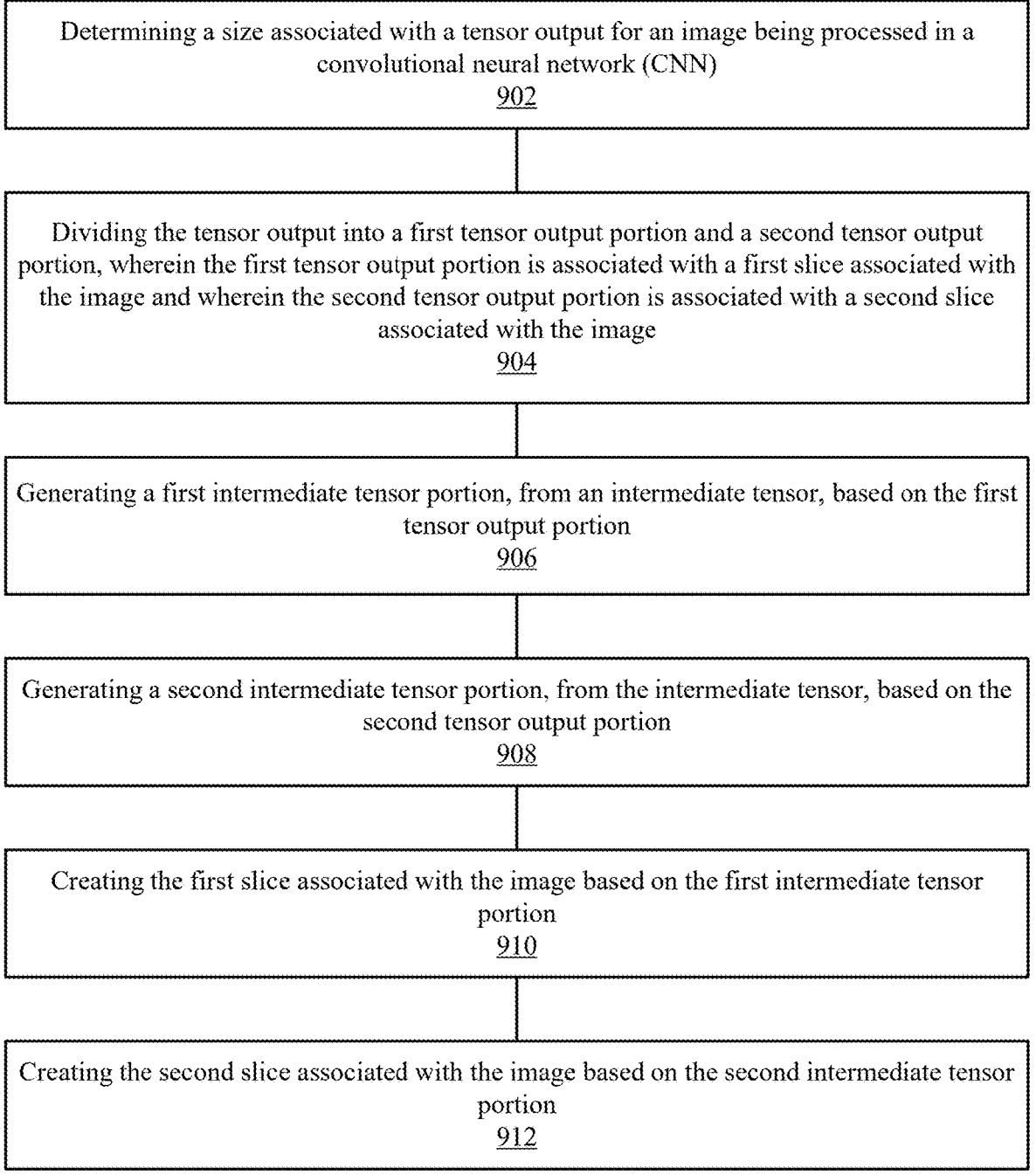

Determining a size associated with a tensor output for an image being processed in a convolutional neural network (CNN)
902

Dividing the tensor output into a first tensor output portion and a second tensor output portion, wherein the first tensor output portion is associated with a first slice associated with the image and wherein the second tensor output portion is associated with a second slice associated with the image
904

Generating a first intermediate tensor portion, from an intermediate tensor, based on the first tensor output portion
906

Generating a second intermediate tensor portion, from the intermediate tensor, based on the second tensor output portion
908

Creating the first slice associated with the image based on the first intermediate tensor portion
910

Creating the second slice associated with the image based on the second intermediate tensor portion
912

FIGURE 9

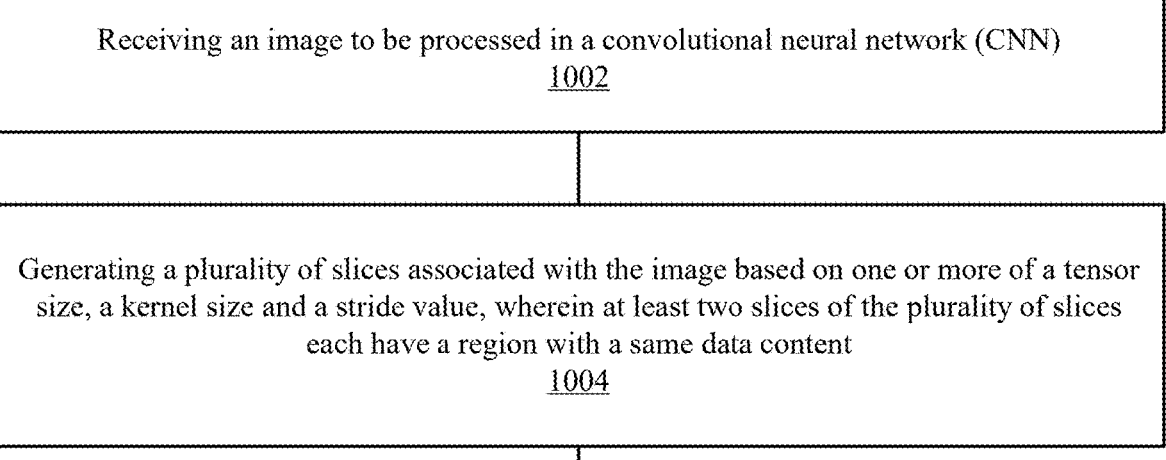

Receiving an image to be processed in a convolutional neural network (CNN)
1002

Generating a plurality of slices associated with the image based on one or more of a tensor size, a kernel size and a stride value, wherein at least two slices of the plurality of slices each have a region with a same data content
1004

Processing each slice of the at least two slices independent of one another
1006

Layer 1/Slice 1

FIGURE 11B

Layer 1/Slice 2

FIGURE 11C

Layer 1/Slice 3

Layer 1/Slice 4

|  | Slice 1 | | | | Slice 2 | | | | Slice 3 | | | | Slice 4 | | | |
|---|---|---|---|---|---|---|---|---|---|---|---|---|---|---|---|---|
| | $o_1$ | $o_2$ | $o_3$ | $o_4$ | $o_5$ | $o_6$ | $o_7$ | $o_8$ | $o_9$ | $o_{10}$ | $o_{11}$ | $o_{12}$ | $o_{13}$ | $o_{14}$ | $o_{15}$ | $o_{16}$ |
| | $q_1$ | $q_2$ | $q_3$ | $q_4$ | $q_5$ | $q_6$ | $q_7$ | $q_8$ | $q_9$ | $q_{10}$ | $q_{11}$ | $q_{12}$ | $q_{13}$ | $q_{14}$ | $q_{15}$ | $q_{16}$ |
| | $r_1$ | $r_2$ | $r_3$ | $r_4$ | $r_5$ | $r_6$ | $r_7$ | $r_8$ | $r_9$ | $r_{10}$ | $r_{11}$ | $r_{12}$ | $r_{13}$ | $r_{14}$ | $r_{15}$ | $r_{16}$ |
| | $s_1$ | $s_2$ | $s_3$ | $s_4$ | $s_5$ | $s_6$ | $s_7$ | $s_8$ | $s_9$ | $s_{10}$ | $s_{11}$ | $s_{12}$ | $s_{13}$ | $s_{14}$ | $s_{15}$ | $s_{16}$ |
| | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
| | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | $u_{16}$ |

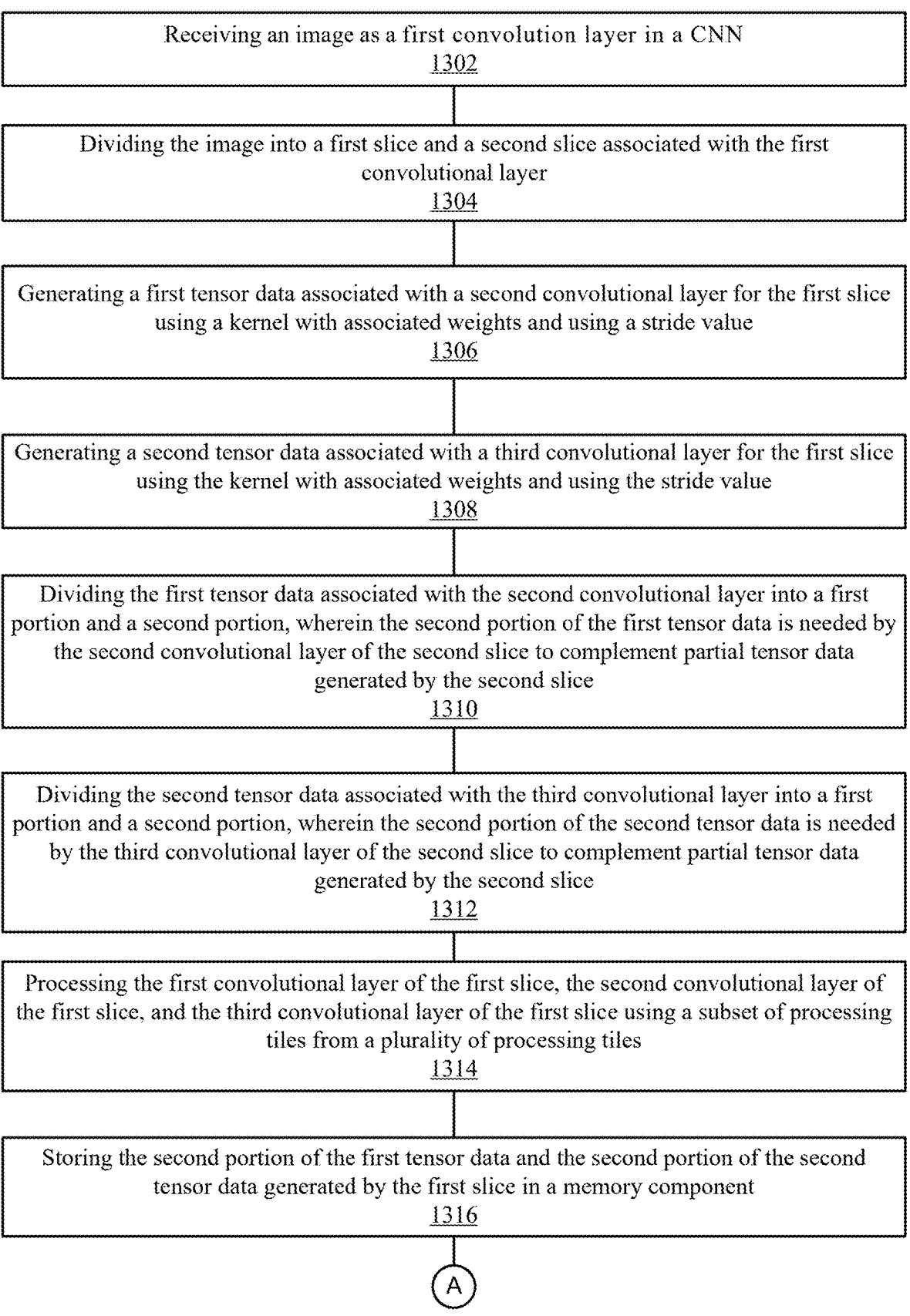

Receiving an image as a first convolution layer in a CNN
1302

Dividing the image into a first slice and a second slice associated with the first convolutional layer
1304

Generating a first tensor data associated with a second convolutional layer for the first slice using a kernel with associated weights and using a stride value
1306

Generating a second tensor data associated with a third convolutional layer for the first slice using the kernel with associated weights and using the stride value
1308

Dividing the first tensor data associated with the second convolutional layer into a first portion and a second portion, wherein the second portion of the first tensor data is needed by the second convolutional layer of the second slice to complement partial tensor data generated by the second slice
1310

Dividing the second tensor data associated with the third convolutional layer into a first portion and a second portion, wherein the second portion of the second tensor data is needed by the third convolutional layer of the second slice to complement partial tensor data generated by the second slice
1312

Processing the first convolutional layer of the first slice, the second convolutional layer of the first slice, and the third convolutional layer of the first slice using a subset of processing tiles from a plurality of processing tiles
1314

Storing the second portion of the first tensor data and the second portion of the second tensor data generated by the first slice in a memory component
1316

Generating a first tensor data associated with the second convolutional layer for the second slice using the kernel with associated weights and using the stride value
1318

Generating a second tensor data associated with the third convolutional layer for the second slice using the kernel with associated weights and using the stride value
1320

Complementing partial tensor data in the second convolutional layer and the third convolutional layer that are generated by the second slice with the second portion of the first tensor data and the second portion of the second tensor data generated by the first slice
1322

FIGURE 13B

METHOD AND SYSTEM FOR GRAPH MANIPULATIONS FOR MACHINE LEARNING INFERENCE ENGINE

RELATED APPLICATION

This application is a Continuation Applications that claims the benefit and priority to the U.S. application Ser. No. 18/121,790 filed on Mar. 15, 2023, which claims the benefit and priority to a provisional application No. 63/339,709 filed on May 9, 2022, which is incorporated herein by reference in its entirety.

BACKGROUND

Use and implementations of machine learning (ML) and artificial intelligence (AI) methods on electronic devices have become ubiquitous. The design of a hardware architecture of an electronic device, which can be but is not limited to a processor, a programmable logic, an application specific integrated circuit (ASIC), or a dedicated ML-specific hardware, often processes different ML models for different ML applications. For example, Convolutional Neural Network (CNN) has become prevalent in image classification that serves as backbone for many ML applications, e.g., autonomous driving. CNN can be applied to images with any size. Even though the number of network constants for a CNN does not change when the image size changes, the activation tensors (i.e., input and output tensors, intermediate tensors, etc.) changes at each layer of the network. For example, the amount of data associated with activation tensors increases while the network constants for a CNN remain unchanged as the image size increases.

Data associated with one or more CNN models, e.g., the network tensor weight, the network tensor bias constants, the network tensor input and output for each network layer, etc., may be transmitted by an application (e.g., a neural network) outside of an ML hardware to one or more processing tiles of the ML hardware (e.g., an inference engine) for processing, e.g., convolution. It is appreciated that each processing tile of the inference engine has one or more processing unit and on-chip memory (OCM). Tensor data may be transmitted and stored within an OCM of a processing tile in order to reduce data movement between various components. Unfortunately, accelerators are limited to smaller images since they are unable to handle large images due to memory resource constraints. For example, while the input, the output, and/or the intermediate tensors may be locally stored on OCMs of the processing tiles for small image sizes, e.g., from 224×224 pixels (0.05 MP) to 1 MP, that is no longer possible for larger images, e.g., images greater than 1 MP, due to memory resource constraints. The size of images has increased over the recent years, e.g., from 224×224 pixels (0.05 MP) to 1 MP and even 8 MP.

In some conventional systems, a compiler may generate sub-optimal code by interleaving additional data copy operations to move the input tensor, output tensor, and/or intermediate tensor from the OCM of the processing tile to a memory such as DDR, which is a memory with larger capacity but also larger latency, and thereafter from the DDR back to the OCM and into the computational flow. Unfortunately, data movement between DDR and OCM is costly, e.g., increases latency, adds energy cost and increase energy footprint of an inference engine, etc.

In some conventional systems, the image may be partitioned into sub-images, e.g., the sub-images once combined form the original image (i.e., puzzle like), in order to enable one or more of the input tensor, output tensor, and/or intermediate tensor to be stored locally within an OCM of processing tiles. Unfortunately, in certain applications such as CNN, performing operations such as convolution creates dependency between the sub-images. As such, the sub-images cannot be processed in parallel due to the dependency between them.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2D depicts an example of an image, a padded image, and its output and intermediate sensors according to one aspect of the present embodiments.

FIGS. 3A-3B depict examples of slicing the output tensor for an image according to one aspect of the present embodiments.

FIGS. 7A-7J depict an example of generating data associated with a fourth slice of an image according to one aspect of the present embodiments.

FIGS. 8A-8B depict an image with overlapping regions created between slices according to one aspect of the present embodiments.

FIG. 9 depicts a flowchart of an example of a process for partitioning an image according to one aspect of the present embodiments.

FIG. 10 depicts another flowchart of an example of a process for partitioning an image according to one aspect of the present embodiments.

FIGS. 11A-11D shows partitioning a first layer of an image according to one aspect of the present embodiments.

FIGS. 12A-12B show partitioning an image in a second layer into slices and making data available from one slice to another slice according to one aspect of the present embodiments.

FIGS. 13A-B depict a flowchart of an example of a process for partitioning an image with reduced computations according to one aspect of the present embodiments.

DETAILED DESCRIPTION

Figure 1:
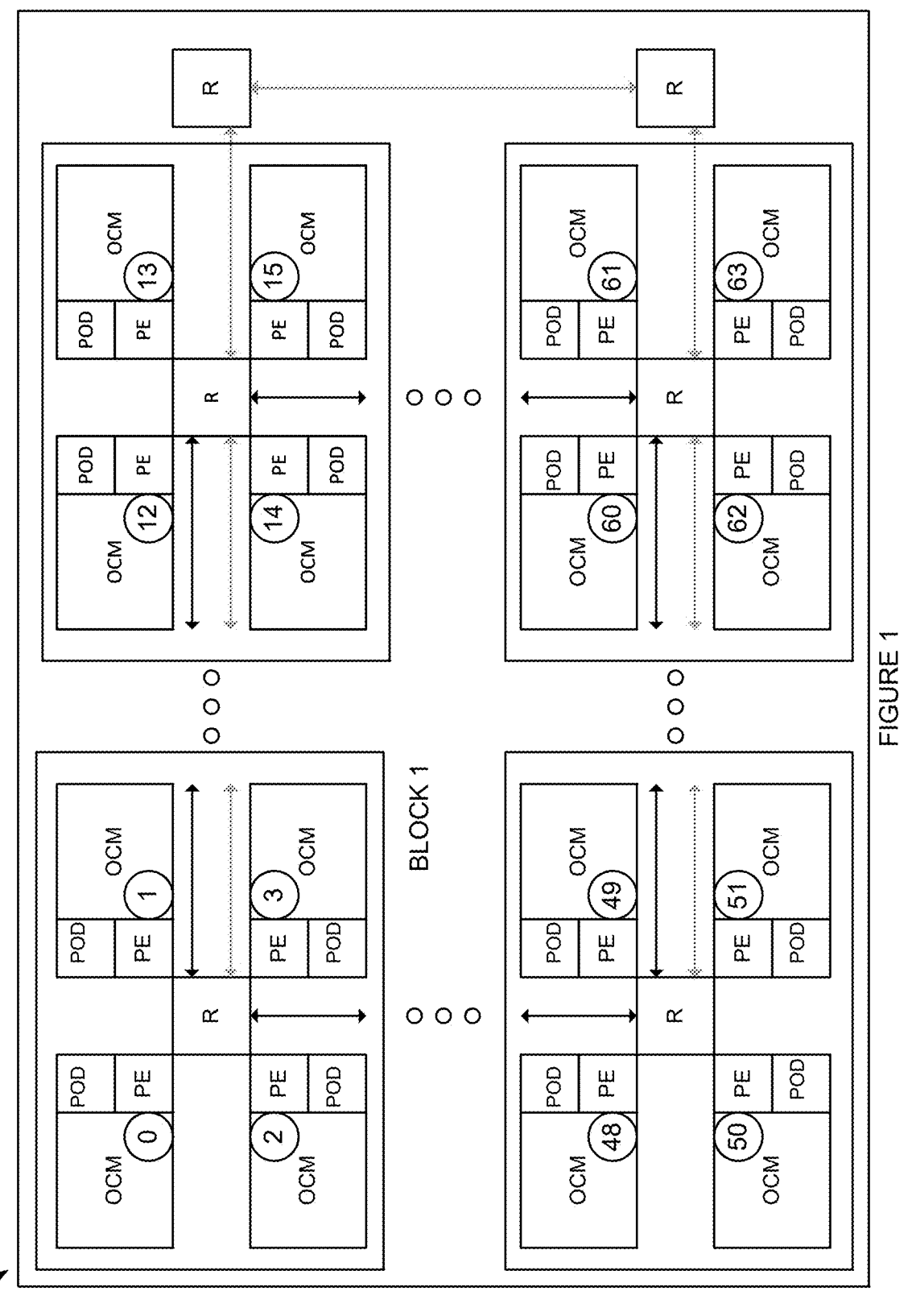
FIG. 1 depicts an example of a diagram of an ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to partition images (for applications such as CNN) into sub-images that can be processed independent from one another (i.e., no dependency between the sub-images) and to enable the input tensor, the output tensor, and/or intermediate tensor to be stored locally within an OCM of processing tile of an ML hardware. It is appreciated that using a plurality of processing tiles enables data (e.g., sub-images without dependencies) to be processed in parallel (i.e., in a much faster fashion in comparison to the sequential processing). In other words, partitioning the image in such a way to avoid dependency between the sub-images enables the sub-images to be processed in parallel while the smaller size (sub-images) allows the activation tensor data to be stored locally within OCMs, e.g., SRAM, of the ML hardware. In some embodiments, the sub-images may be executed in parallel to one another if desired, or in a sequential manner, or in out of order chronological ordering, since the sub-images are independent (i.e., have no dependency on one another) from one another. As a result, the need to move data between the OCMs of the ML hardware and an external component, e.g., DDR, host, etc., to the ML hardware after the data is stored in the OCMs is eliminated.

For a non-limiting example, the ML hardware may include 64 processing tiles (each processing tile may further include a plurality of smaller processing elements that are described in the U.S. patent application Ser. No. 16/226,508, filed Dec. 19, 2018, now issued as the U.S. Pat. No. 11,086,633 that is incorporated herein by reference in its entirety). Each of those processing tiles is configured to receive a tensor data and an instruction (i.e., compiled SoftMax instructions, ArgMax instruction, TopK, GEMM, SUM, MUL, etc.). As such, multiple tensors may be operated on simultaneously, thereby reducing the processing time. For illustrative purposes, it is assumed that there are 64 processing tiles where each processing element is configured to process 64 elements. However, it is appreciated that any number of processing tiles may be used.

The proposed ML hardware architecture (as described in the U.S. Pat. No. 11,086,633 and as further described in FIG. 1 below) is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

It is appreciated that the embodiments are described with respect to CNN with ResNet as a nonlimiting example but the embodiments should not be construed as limited thereto. It is appreciated that convolution (in a CNN application) creates a dependency between sub-images (adjacent sub-images) of an image. However, if the image is subdivided in such as a way to create an overlap between different sub-images (i.e., adjacent sub-images having a region that is duplicated for each sub-image), then the dependency is eliminated and each sub-image can be processed independent of any other sub-image. As such, partitioning an image to create an overlap between adjacent sub-images (duplication a region of one sub-image in a second sub-image) enables the ML hardware to process the sub-images independent of one another (i.e., in parallel, sequential order, different chronological ordering, etc.). It is appreciated that the image may be partitioned (i.e., sliced) into a collection of adjacent sub-images with overlap between the slices, thereby eliminating a need to move data between the slices.

In general, CNNs are used as backbone for automotive networks. Such detection models include a feature pyramid which the CNN feeds into. It is appreciated that the pyramid and backbone are connected in such a way that the CNN provides activation tensors as input to the pyramid at various stages of the CNN network, e.g., $\frac{1}{4}$ resolution, $\frac{1}{8}$ resolution, $\frac{1}{16}$ resolution, and $\frac{1}{32}$ resolution of the original image resolution. It is appreciated that the full activation tensors are calculated for the CNN model at each of these points (resolutions), thereby making the resolution points suitable for synch points for the algorithm described below.

It is appreciated that rather than mapping the entire CNN graph to an intermediate representation layer by layer, graph manipulations are performed prior to the mapping to generate an equivalent graph (with an overlap to remove dependency between slices). It is appreciated that a type of graph manipulation may include image manipulation. In general, a graph may be a representation of a neural network that describes the operations, e.g., layers, and the dependency between the layers based on the data flow, e.g., an output activation of a layer being used as an input activation layer of a subsequent layer. For ResNet model, the graph stages are sliced into independent executable graphs without dependency on one another, i.e., no need for inter-graph communication (unlike conventional methods). It is appreciated that a graph stage is between the input and first synch point, between consecutive synch points, or between the last synch point and an output. Accordingly, the set of slices can be executed in parallel (i.e., processed independently since there is no dependency between the slices) rather than having to be executed sequentially. It is appreciated that the ability to be executed in parallel does not necessarily mean that the set of graphs are executed in parallel. For example, the set of slices may be executed in sequential manner even though they can be executed in parallel. In some embodiments, the set of slices may be executed in sequential and out of chronological ordering manner since they are independent from one another. In some examples, a set of graphs (each graph including multiple slices) are created from the large input models with multiple graphs where the slices within each graph are executed in parallel while the graphs may or may not be executed in parallel to one another, depending on availability of hardware resources. It is appreciated that the process is performed for each stage in isolation (because each stage has full intermediate tensor data). It is appreciated that at the end of the last stage, full intermediate tensor data may be generated by concatenating the intermediate data from each stage. In ResNet example, multiple graphs may be conceived to represent the CNN network that are equivalent to one another. In one nonlimiting example, a graph may map each operation, e.g., Convolution or Pooling, to a single layer that acts on the complete tensors at each layer. Another graph may split one specific operation into a set of operations and creates a graph that may split one tensor into a set of tensors. The tensors may be fed into an operator, represented as a "layer", creating a partial result. It is appreciated that the partial results are combined by a subsequent layer. The embodiments described herein are directed to transformation of the network for the entire graph, prior to mapping it to an intermediate representation that will be used as input to the compiler for code generation. It is appreciated that introducing the slices according to some embodiments provides a dependency between partial tensors and at synch points dependency to complete tensors. An equivalent graph that is then mapped to intermediate representation. Thus, a new graph may include a set of partial graphs, where each partial graph represents a slice.

In the example of FIG. 1, the ML-specific hardware 100 is a dedicated hardware, including one or more processors and/or OCM units storing the data and/or the set of low-level instructions compiled from the high-level code by the compiler to perform one or more ML operations, e.g., SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (e.g., POD) for performing a first type of ML (e.g., dense) operations, and a second type of processing unit (e.g., PE) for performing a second type of ML (e.g., sparse) operations. Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Referring now to FIG. 2A, an image 200A is show for illustrative purposes. In this example, the image 200A is 11×31 pixels for illustrative purposes only that should not be construed as limiting the scope of the embodiments. Row 1 of the image 200A includes pixels $a_1, a_2, a_3, \ldots, a_{31}$. Row 2 of the image 200A includes pixels $b_1, b_2, b_3, \ldots, b_{31}$. Row 3 of the image 200A includes pixels $c_1, c_2, c_3, \ldots, c_{31}$. Row 4 of the image 200A includes pixels $d_1, d_2, d_3, \ldots, d_{31}$. Row 5 of the image 200A includes pixels $e_1, e_2, e_3, \ldots, e_{31}$. Row 6 of the image 200A includes pixels $f_1, f_2, f_3, \ldots, f_{31}$. Row 7 of the image 200A includes pixels $g_1, g_2, g_3, \ldots, g_{31}$. Row 8 of the image 200A includes pixels $h_1, h_2, h_3, \ldots, h_{31}$. Row 9 of the image 200A includes pixels $i_1, i_2, i_3, \ldots, i_{31}$. Row 10 of the image 200A includes pixels $j_1, j_2, j_3, \ldots, j_{31}$. Row 11 of the image 200A includes pixels $k_1, k_2, k_3, \ldots, k_{31}$.

Figure 2B:
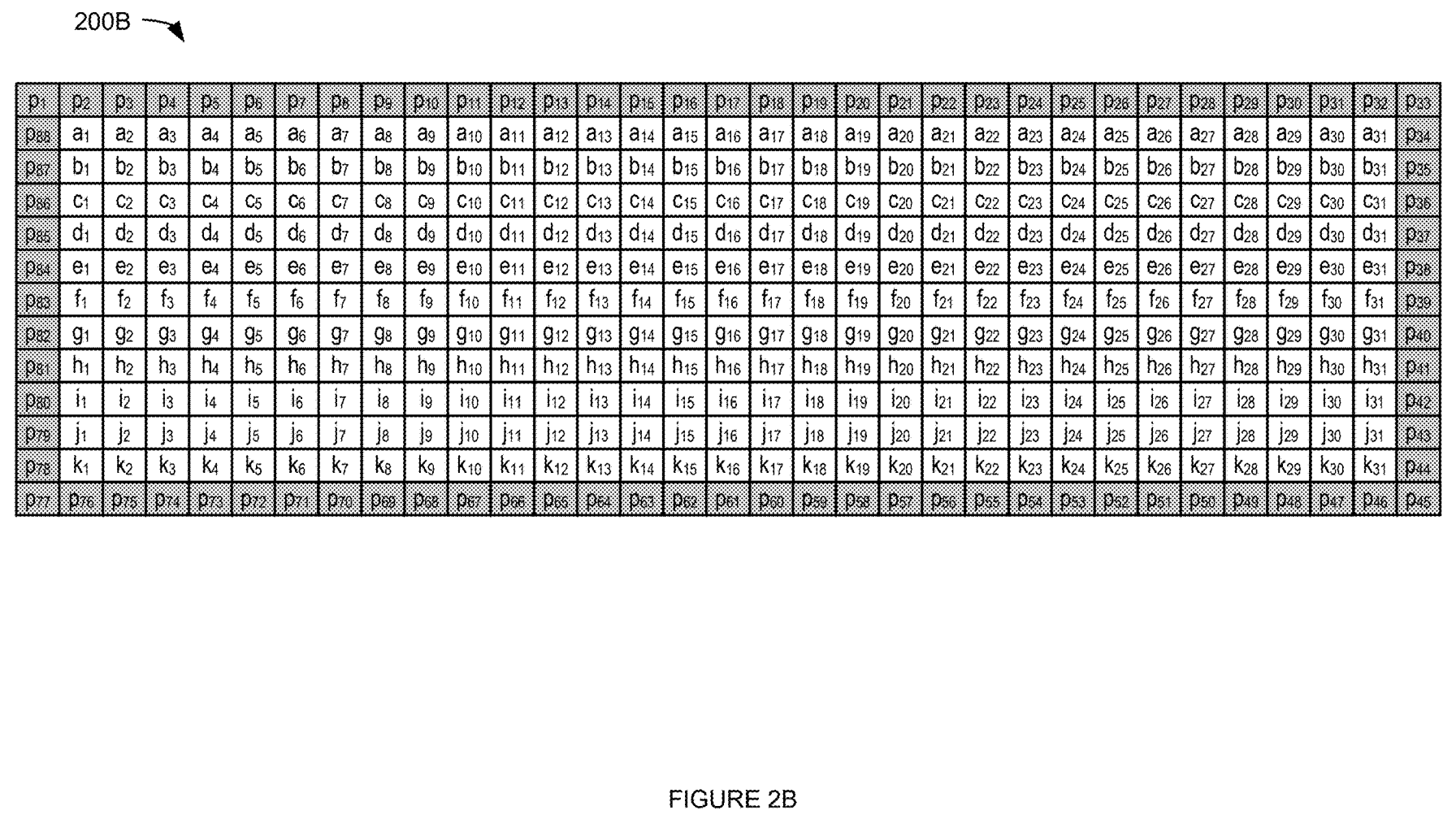

It is appreciated that the kernel size of 3×3 and a stride of 2 is used for illustrative purposes only and should not be construed as limiting the scope of the embodiments. For example, a kernel size of 4×4 and stride of 3 may be used. In some embodiments, a padding may be needed depending on the image size, the kernel size, and/or the stride, as determined by a compiler or software. In this nonlimiting example, a one pixel padding is used to surround the image 200A, as shown in FIG. 2B. The image 200B includes the image 200A and padding pixels $p_1, p_2, p_3, \ldots, p_{88}$. The padding may be any value that is inserted, e.g., a 0 value.

In this example, the compiler (not shown) may determine that two consecutive convolution layers of a CNN are treated as a graph stage. In some embodiments, the image 200A is padded, as shown in 200B with a kernel of 3×3 and stride 2. Moreover, the compiler may use metadata and/or tensor size to determine the intermediate tensor size and the output tensor size for each layer. For example, FIG. 2C illustrates a tensor (e.g., an intermediate tensor) associated with the processing (i.e., layer 1) as determined by a compiler. The intermediate tensor size in this example is 6×16. The first row may include $o_1, o_2, o_3, \ldots, o_{16}$. The second row may include $q_1, q_2, q_3, \ldots, q_{16}$. The third row may include $r_1, r_2, r_3, \ldots, r_{16}$. The fourth row may include $s_1, s_2, s_3, \ldots, s_{16}$. The fifth row may include $t_1, t_2, t_3, \ldots, t_{16}$. The sixth row may include $u_1, u_2, u_3, \ldots, u_{16}$.

In this example, the compiler may determine that the output tensor size is 3×8, as shown in FIG. 2D. The tensor shown in FIG. 2D is associated with layer 2 processing of the image. The first row may include $l_1, l_2, l_3, \ldots, l_8$. The second row may include $m_1, m_2, m_3, \ldots, m_8$. The third row may include $n_1, n_2, n_3, \ldots, n_8$. It is appreciated that 2 layers are shown for illustrative purposes and should not be construed as limiting the scope of the embodiments. For example, in some embodiments more than 2 layers may be used, e.g., 3 layers, 4 layers, etc.

It is appreciated that the compiler knowing the size for the tensor output and the intermediate tensor(s) can determine the manner in which the image 200A or padded image 200B to be partitioned in order to create overlapping sub-images in order to eliminate a need for data from one slice to be communicated to another slice. Overlapping sub-images creates a duplication of a portion (e.g., edge) of one sub-image in a portion (e.g., edge) of another (e.g., adjacent) sub-image. As such, each slice may be processed independent of other slices and enables the ML hardware to process them in parallel, if desired. Alternatively, the slices may be executed in sequential manner and in any chronological order since the slices are independent of one another. Moreover, dividing the image into sub-images enables the image to be divided into smaller sizes where tensor data (e.g., intermediate tensor data) to be locally stored within the OCMs of processing tiles, thereby eliminating the need to move data between an external component, e.g., DDR memory, and the OCMs.

It is appreciated that instead of dividing the image into sub-images, the compiler uses the tensor sizes (output tensor, and intermediate tensor(s)) to make a decision on how the image should be partitioned. In other words, the compiler moves from the output tensor to the intermediate tensor(s) to the input image rather than from the image down, as it is done in the conventional methods.

Referring now to FIG. 3A, the output tensor as shown in FIG. 2D is used to determine the location and the number of slices for the image 200A or 200B. In this example, the compiler may determine that the tensor output 310 that is $3\times1$, includes elements $l_1$, $m_1$, and $n_1$ is associated with slice 1. Similarly, the compiler may determine that the tensor output 320 that is $3\times2$, includes elements $l_2$, $l_3$ in row 1, $m_2$, $m_3$ in row 2, and $n_2$, $n_3$ in row 3 is associated with slice 2. Similarly, the compiler may determine that the tensor output 330 that is $3\times2$, includes elements $l_4$, $l_5$ in row 1, $m_4$, $m_5$ in row 2, and $n_4$, $n_5$ in row 3 is associated with slice 3. The compiler may determine that the tensor output 340 that is $3\times3$, includes elements $l_6$, $l_7$, $l_8$ in row 1, $m_6$, $m_7$, $m_8$ in row 2, and $n_6$, $n_7$, $n_8$ in row 3 is associated with slice 4. It is appreciated that in some embodiments, the compiler may determine the location of the slice and process the image and if needed may revert back and perform a different slicing strategy to achieve higher performance, e.g., processing time, data movement, etc.

Referring now to FIG. 3B, the output tensor as shown in FIG. 2D is used to determine the location and the number of slices for the image 200A or 200B, similar to that of FIG. 3A except that in this nonlimiting example, the size of the slices are different from that of FIG. 3A. In this example, the compiler may determine that the tensor output 350 that is $3\times2$, includes elements $l_1$, $l_2$ in row 1, $m_1$, $m_2$ in row 2, and $n_1$, $n_2$ is associated with slice 1. Similarly, the compiler may determine that the tensor output 360 that is $3\times3$, includes elements $l_3$, $l_4$, $l_5$ in row 1, $m_3$, $m_4$, $m_5$ in row 2, and $n_3$, $n_4$, $n_5$ in row 3 is associated with slice 2. Similarly, the compiler may determine that the tensor output 370 that is $3\times1$, includes elements $l_6$, $m_6$, $n_6$ is associated with slice 3. The compiler may determine that the tensor output 380 that is $3\times2$, includes elements $l_7$, $l_8$ in row 1, $m_7$, $m_8$ in row 2, and $n_7$, $n_8$ in row 3 is associated with slice 4.

For illustrative purposes, the slicing as shown in FIG. 3A is selected and used for subsequent figures and descriptions.

Figures 4A, 4B, 4C:
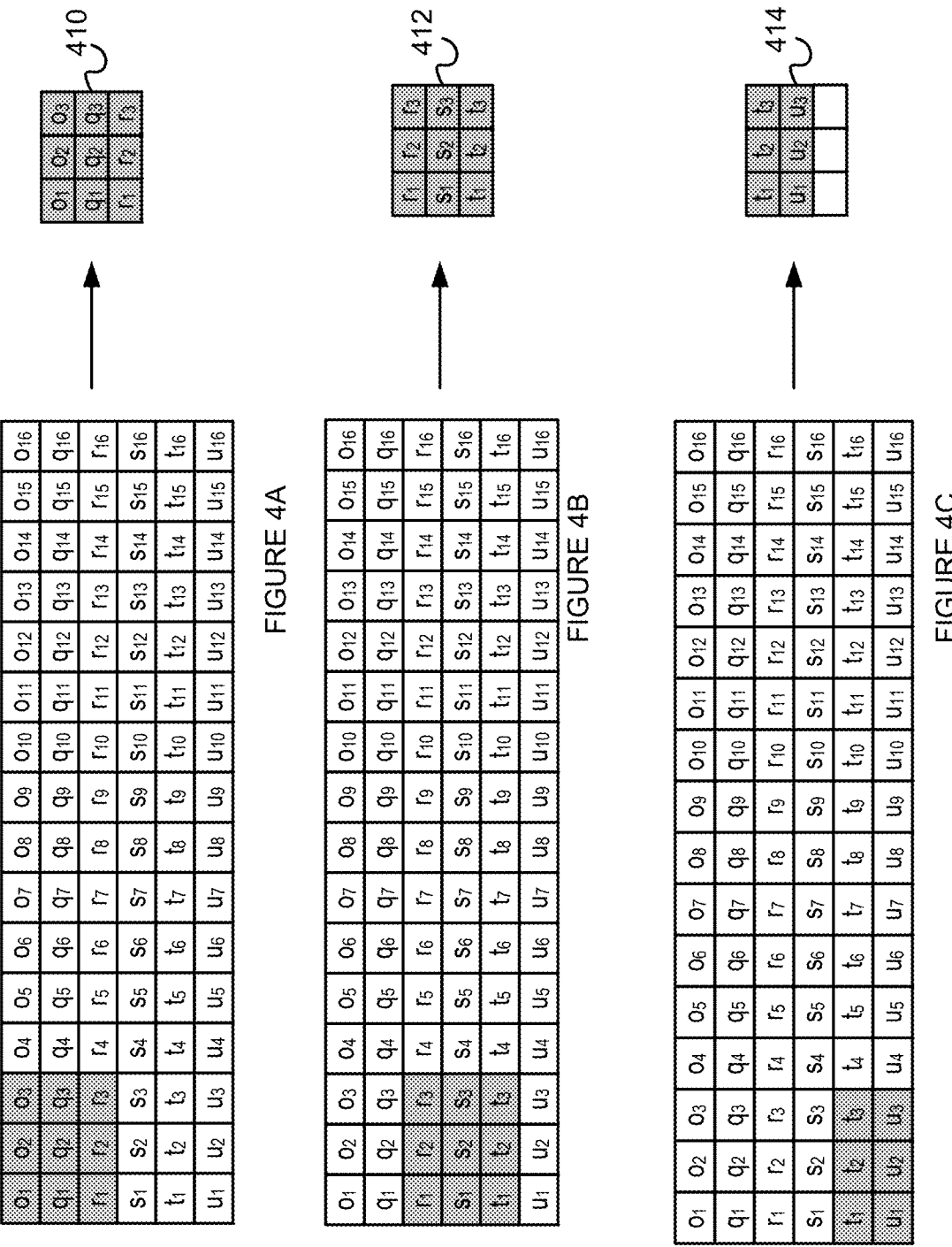
FIGS. 4A-4D depict an example of generating data associated with a first slice of an image according to one aspect of the present embodiments.
Figure 4D:
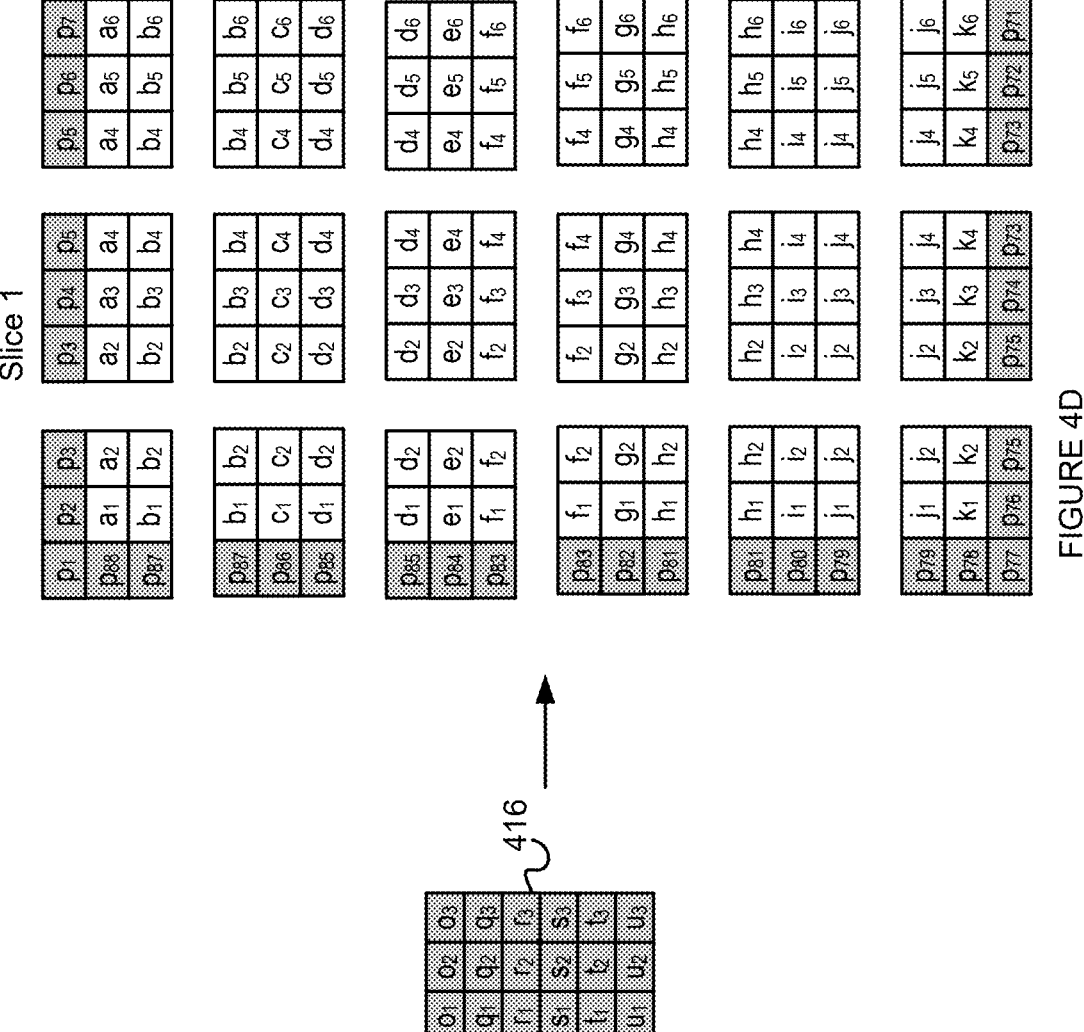

Referring now to FIGS. 4A-4D illustrate the manner in which the tensor output 310 (i.e., first slice) is generated from the intermediate tensor (shown in FIG. 2C). In this example, the kernel size is $3\times3$ and the stride is 2 for illustrative purpose. As such, a kernel overlaying the image (hereinafter kernel overlaying an image or portion thereof is referred to as kernel interchangeably) is shown as the first kernel 410 of $3\times3$ that is $$\begin{bmatrix} o1 & \cdots & o3 \\ \vdots & \ddots & \vdots \\ r1 & \cdots & r3 \end{bmatrix},$$

as shown in FIG. 4A. Since the tensor output 310 is $3\times1$ and the stride is 2 then the second kernel 412 of $3\times3$ is $$\begin{bmatrix} r1 & \cdots & r3 \\ \vdots & \ddots & \vdots \\ t1 & \cdots & t3 \end{bmatrix}$$

as shown in FIG. 4B. It is appreciated that in each figure the kernel overlaying the image is shown. Similarly, the third kernel 414 of $3\times3$ is $$\begin{bmatrix} t1 & \cdots & t3 \\ u1 & \cdots & u3 \\ 0 & \cdots & 0 \end{bmatrix},$$

as shown in FIG. 4C. In this example, since the intermediate tensor size is $6\times16$, the bottom row of kernel 414 is empty and as such is padded with a value (in this example 0s entered). Once the intermediate tensors 410, 412, and 414 are put together the intermediate tensor 416 for the first slice is formed, as shown in FIG. 4D. Slice 1 of the image 200B may be formed by applying a kernel size of $3\times3$ and stride of 2 to the image 200B in order to form the tensor 416, as shown in FIG. 4D. In this example, the first kernel $3\times3$ applied to the image 200B and forms 01 of the intermediate tensor 416. In this example, $$o_1 = \begin{bmatrix} p1 & \cdots & p3 \\ \vdots & \ddots & \vdots \\ p87 & \cdots & b2 \end{bmatrix}.$$

Since the intermediate tensor 416 includes 3 columns and the stride is 2, then $$o_3 = \begin{bmatrix} p5 & \cdots & p7 \\ \vdots & \ddots & \vdots \\ b4 & \cdots & b6 \end{bmatrix}.$$

and $$o_2 = \begin{bmatrix} p3 & \cdots & p5 \\ \vdots & \ddots & \vdots \\ b2 & \cdots & b4 \end{bmatrix}$$

As illustrated, there is an overlap between $o_1$ and $o_2$, and further between $o_2$ and $o_3$. It is appreciated that a similar process is repeated to generate each of the elements of the intermediate tensor, i.e., $q_1$, $q_2$, $q_3$, $r_1$, $r_2$, $r_3$, $s_1$, $s_2$, $s_3$, $t_1$, $t_2$, $t_3$, and $u_1$, $u_2$, $u_3$. It is appreciated that there is an overlap between $q_1$ and $q_2$, and further between $q_2$ and $q_3$. It is appreciated that there is an overlap between $r_1$ and $r_2$, and further between $r_2$ and $r_3$. It is appreciated that there is an overlap between $s_1$ and $s_2$, and further between $s_2$ and $s_3$. It is appreciated that there is an overlap between $t_1$ and $t_2$, and further between $t_2$ and $t_3$. It is appreciated that there is an overlap between $u_1$ and $u_2$, and further between $u_2$ and $u_3$.

It is appreciated that there is an overlap between $o_1$ and $q_1$, $q_1$ and $r_1$, $r_1$ and $s_1$, $s_1$ and $t_1$, and $t_1$ and $u_1$. Similarly, there is an overlap between $o_2$ and $q_2$, $q_2$ and $r_2$, $r_2$ and $s_2$, $s_2$ and $t_2$, and $t_2$ and $u_2$. Similarly, there is an overlap between $o_3$ and $q_3$, $q_3$ and $r_3$, $r_3$ and $s_3$, $s_3$ and $t_3$, and $t_3$ and $u_3$.

Figures 5A, 5B, 5C:
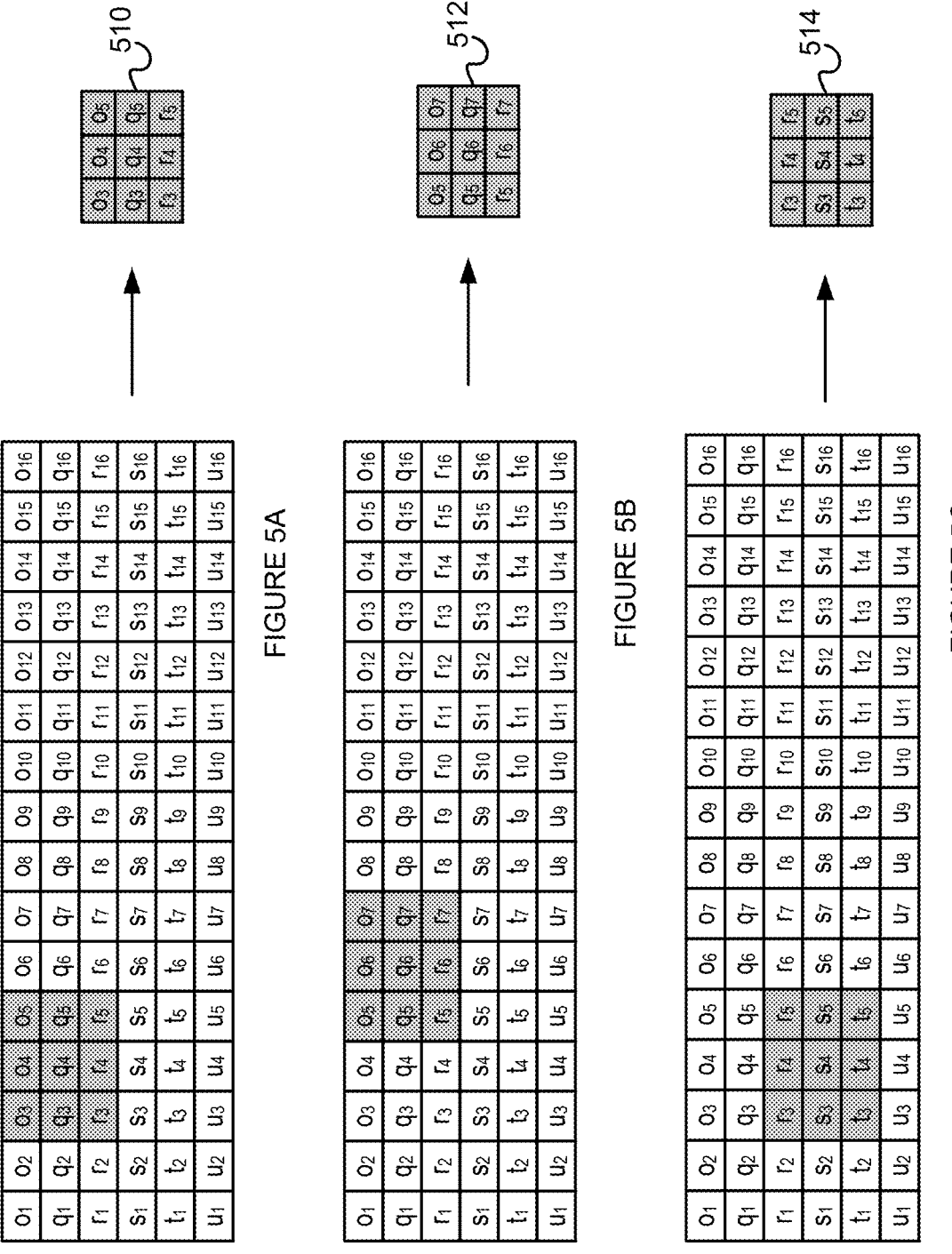
FIGS. 5A-5G depict an example of generating data associated with a second slice of an image according to one aspect of the present embodiments.
Figures 5D, 5E, 5F:
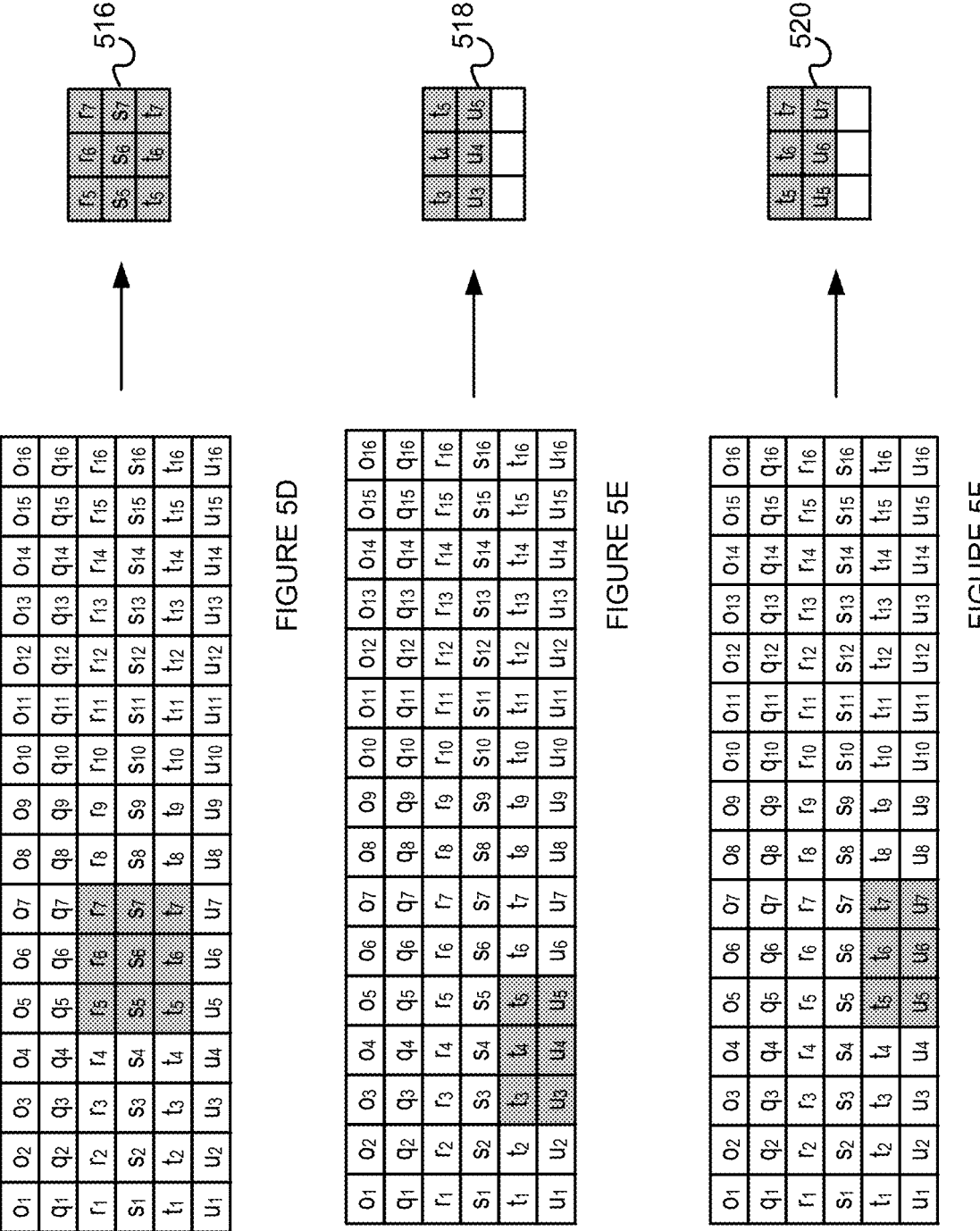
Figure 5G:
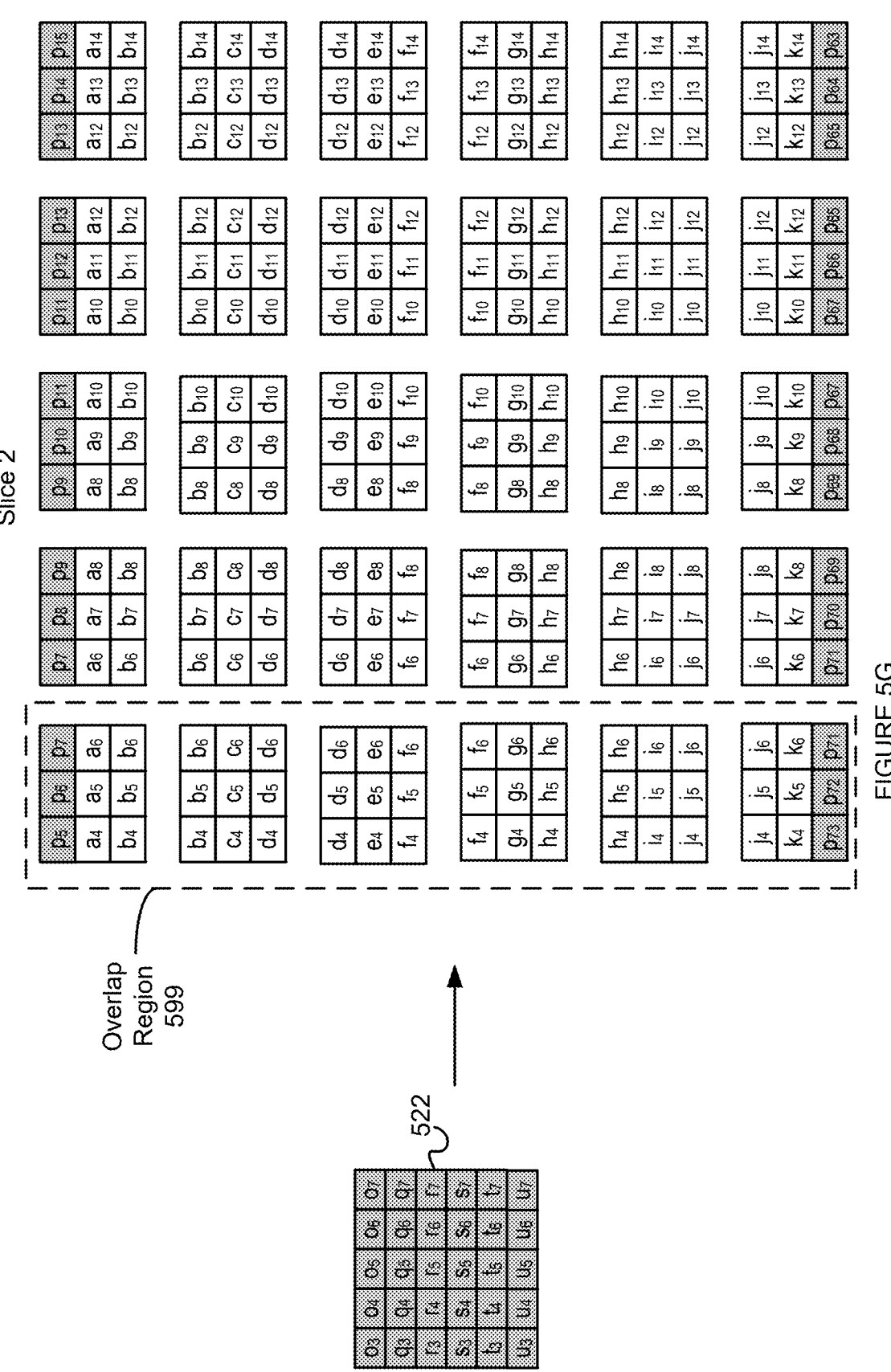

Referring now to FIGS. 5A-5G illustrate the manner in which the tensor output 320 (i.e., second slice) is generated from the intermediate tensor (shown in FIG. 2C). In this example, the kernel size is 3×3 and the stride is 2 for illustrative purpose. As such, the first kernel 510 of 3×3 that is $$\begin{bmatrix} o3 & \cdots & o5 \\ \vdots & \ddots & \vdots \\ r3 & \cdots & r5 \end{bmatrix}$$

as shown in FIG. 5A. It is appreciated that in each subsequent figure the kernel is overlayed the image based on its size, stride, etc. Since the tensor output 320 is 3×2 and the stride is 2 then the kernel 512 of 3×3 is $$\begin{bmatrix} o5 & \cdots & o7 \\ \vdots & \ddots & \vdots \\ r5 & \cdots & r7 \end{bmatrix},$$

as shown in FIG. 5B. Similarly, the kernel 514 of 3×3 is $$\begin{bmatrix} r3 & \cdots & r5 \\ \vdots & \ddots & \vdots \\ t3 & \cdots & t5 \end{bmatrix},$$

as shown in FIG. 5C. Similarly, the kernel 516 of 3×3 is $$\begin{bmatrix} r5 & \cdots & r7 \\ \vdots & \ddots & \vdots \\ t5 & \cdots & t7 \end{bmatrix},$$

as shown in FIG. 5D. Moreover, the kernel 518 of 3×3 is $$\begin{bmatrix} t3 & \cdots & t5 \\ u3 & \cdots & u5 \\ 0 & \cdots & 0 \end{bmatrix},$$

as shown in FIG. 5E and kernel 520 of 3×3 is $$\begin{bmatrix} t5 & \cdots & t7 \\ u5 & \cdots & u7 \\ 0 & \cdots & 0 \end{bmatrix},$$

as shown in FIG. 5F. In this example, since the intermediate tensor size is 6×16, the bottom row of kernels 518 and 520 are empty and as such is padded with a value (in this example 0s entered). Once the intermediate tensors 510, 512, 514, 516, 518, and 520 are put together the intermediate tensor 522 for the second slice is formed, as shown in FIG. 5G. Slice 2 of the image 200B may be formed by applying a kernel size of 3×3 and stride of 2 to the image 200B in order to form the tensor 522, as shown in FIG. 5G. In this example, the first kernel 3×3 applied to the image 200B and forms $o_3$ of the intermediate tensor 522. In this example, $$o_3 = \begin{bmatrix} p5 & \cdots & p7 \\ \vdots & \ddots & \vdots \\ b4 & \cdots & b6 \end{bmatrix}.$$

Since the intermediate tensor 522 includes 3 columns and the stride is 2, then $$o_4 = \begin{bmatrix} p7 & \cdots & p9 \\ \vdots & \ddots & \vdots \\ b6 & \cdots & b8 \end{bmatrix}, o_5 = \begin{bmatrix} p9 & \cdots & p11 \\ \vdots & \ddots & \vdots \\ b8 & \cdots & b10 \end{bmatrix},$$

$$o_6 = \begin{bmatrix} p11 & \cdots & p13 \\ \vdots & \ddots & \vdots \\ b10 & \cdots & b12 \end{bmatrix}, \text{ and } o_7 = \begin{bmatrix} p13 & \cdots & p15 \\ \vdots & \ddots & \vdots \\ b12 & \cdots & b14 \end{bmatrix}.$$

As illustrated, there is an overlap between $o_3$ and $o_4$, $o_4$ and $o_5$, $o_5$ and $o_6$, and further between $o_6$ and $o_7$. It is appreciated that a similar process is repeated to generate each of the elements of the intermediate tensor 522, i.e., $q_3$ . . . , $q_7$. $r_3$, . . . , 17, $s_3$, . . . , $s_7$, $t_3$, . . . , $t_7$, and $u_3$, . . . , $u_7$. It is appreciated that there is an overlap between $q_3$ and $q_4$, $q_4$ and $q_5$, $q_5$ and $q_6$, and further between $q_6$ and $q_7$. It is appreciated that there is an overlap between $r_3$ and $r_4$, $r_4$ and $r_5$, $r_5$ and $r_6$, and further between $r_6$ and $r_7$. It is appreciated that there is an overlap between $s_3$ and $s_4$, $s_4$ and $s_5$, $s_5$ and $s_6$, and further between $s_6$ and $s_7$. It is appreciated that there is an overlap between $t_3$ and $t_4$, $t_4$ and $t_5$, $t_5$ and $t_6$, and further between $t_6$ and $t_7$. It is appreciated that there is an overlap between $u_3$ and $u_4$, $u_4$ and $u_5$, $u_5$ and $u_6$, and further between $u_6$ and $u_7$.

It is appreciated that there is an overlap between $o_3$ and $q_3$, $q_3$ and $r_3$, $r_3$ and $s_3$, $s_3$ and $t_3$, and $t_3$ and $u_3$. Similarly, there is an overlap between $o_4$ and $q_4$, $q_4$ and $r_4$, $r_4$ and $s_4$, $s_4$ and $t_4$, and $t_4$ and $u_4$. Similarly, there is an overlap between $o_5$ and $q_5$, $q_5$ and $r_5$, $r_5$ and $s_5$, $s_5$ and $t_5$, and $t_5$ and $u_5$. Similarly, there is an overlap between $o_6$ and $q_6$, $q_6$ and $r_6$, $r_6$ and $s_6$, $s_6$ and $t_6$, and $t_6$ and $u_6$. Similarly, there is an overlap between $o_7$ and $q_7$, $q_7$ and $r_7$, $r_7$ and $s_7$, $s_7$ and $t_7$, and $t_7$ and $u_7$.

It is appreciated that slice 2 has an overlap region 599 with slice 1. In other words, tensor data $o_3$, $q_3$, $r_3$, $s_3$, $t_3$, and $u_3$ are present in both slices 1 and 2 and that the data in the overlap region of slice 1 is being duplicated and made available to slice 2. In this nonlimiting example, the overlap region 599 causes the same data to be processed both in slice 1 and slice 2, thereby eliminating the need to communicate data from one slice to another slice (i.e., removing the dependency), thereby enabling the slices to be performed in parallel and independent of one another. For example, slice 1 may be operated on by a first subset of processing tiles while slice 2 is being operated on in parallel by a second subset of processing tiles. It is further appreciated that since the slices are independent of one another they may be executed in sequential manner if desired or even in any chronological ordering, as desired. Moreover, it is appreciated that since the image is divided into smaller sub-images then the data associated with each sub-image may be stored entirely within the OCMs of the processing tiles, thereby eliminating the need to move data back and forth between the OCMs and an external memory such as DDR memory.

Figures 6A, 6B, 6C:
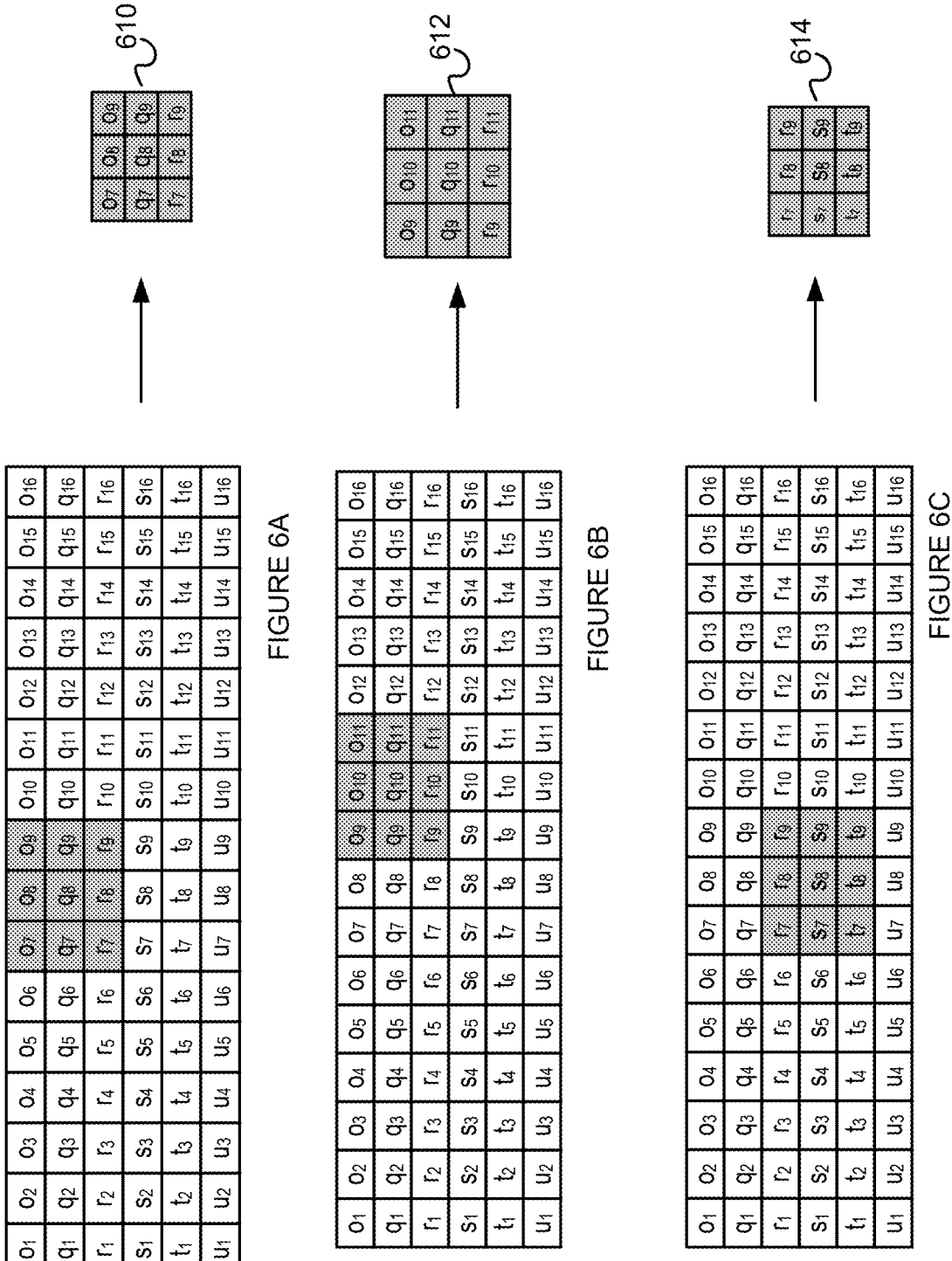
FIGS. 6A-6G depict an example of generating data associated with a third slice of an image according to one aspect of the present embodiments.
Figures 6D, 6E, 6F:
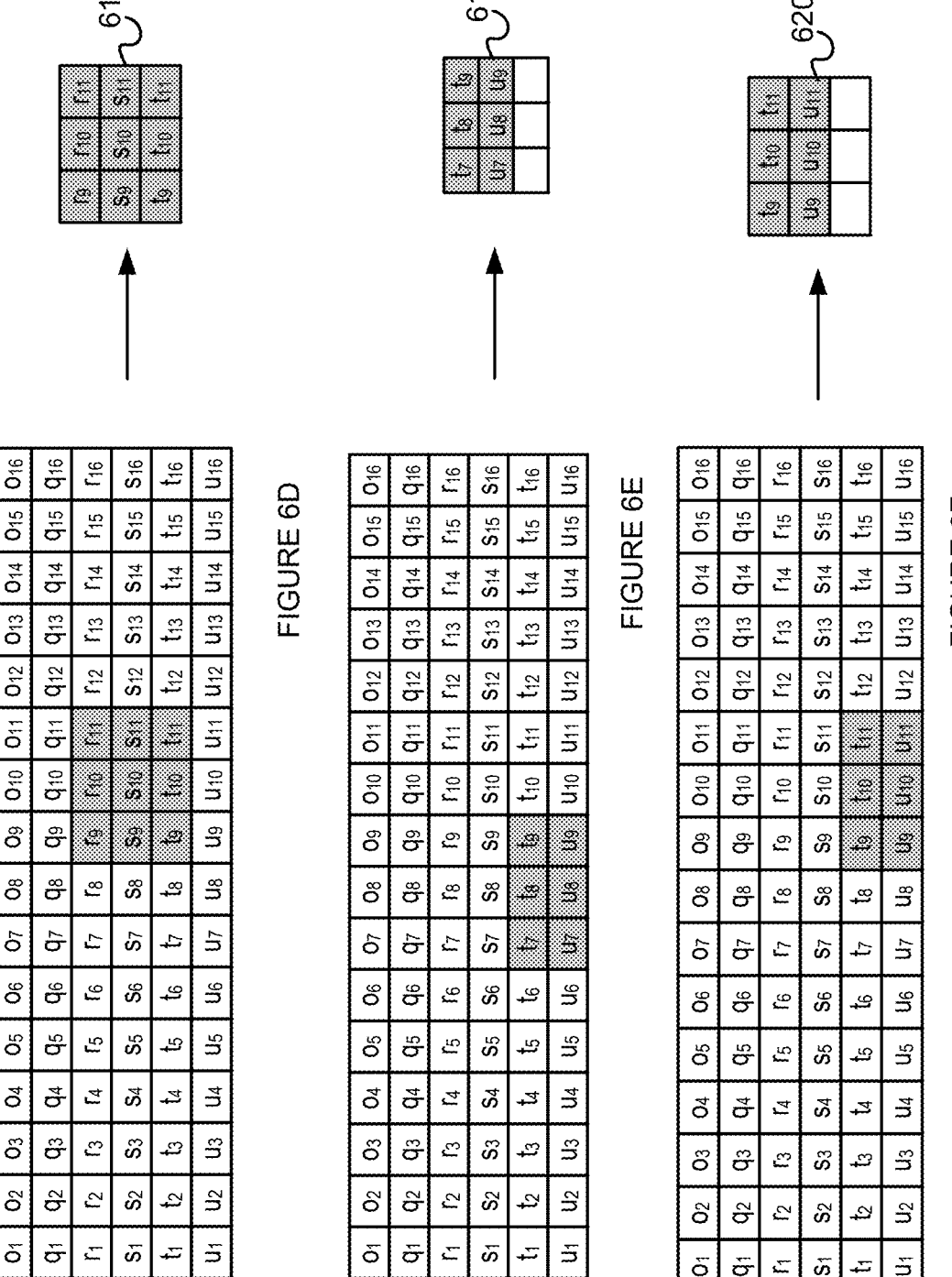
Figure 6G:
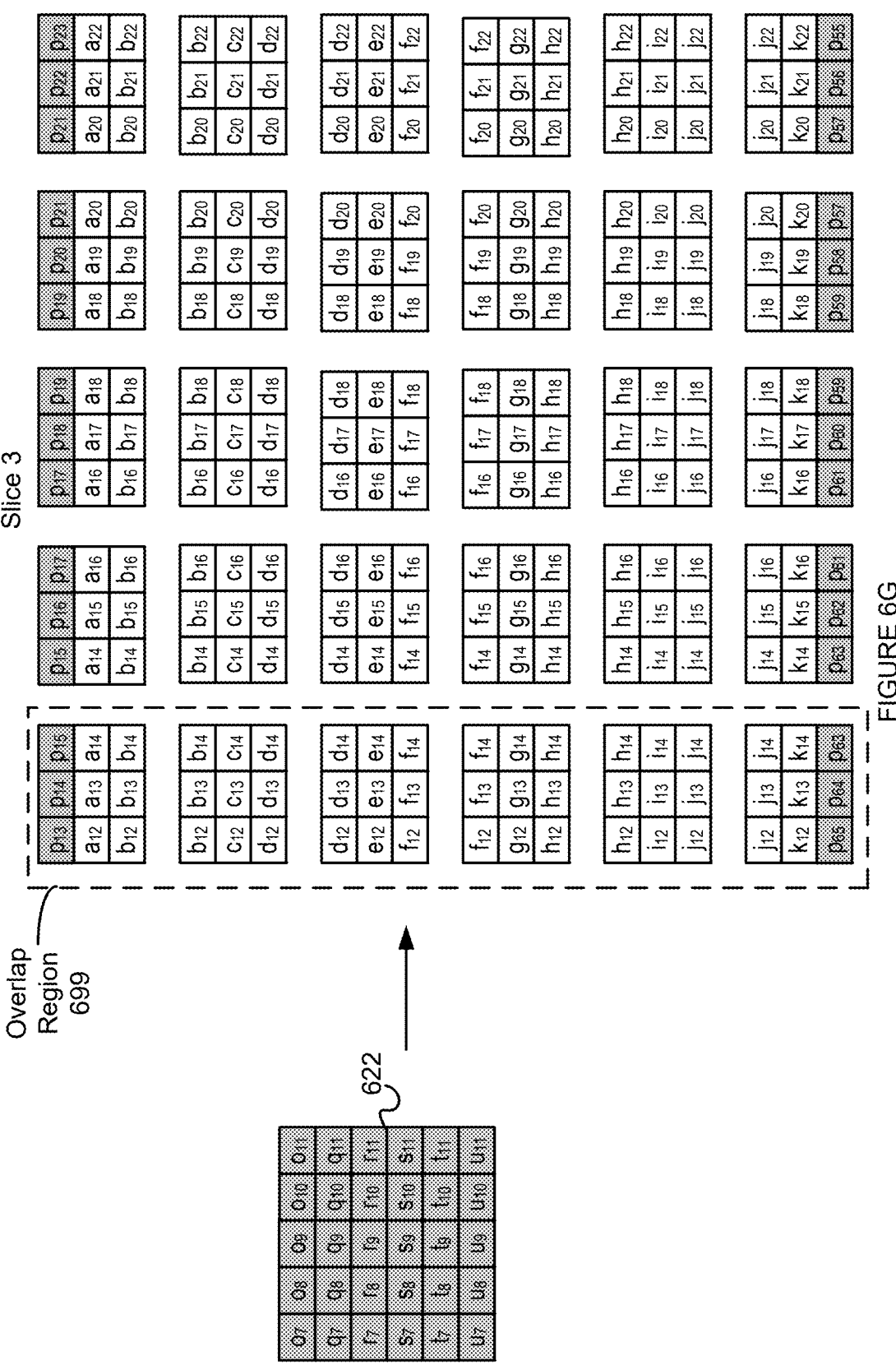

Referring now to FIGS. 6A-6G illustrate the manner in which the tensor output 330 (i.e., third slice) is generated from the intermediate tensor (shown in FIG. 2C). In this example, the kernel size is 3×3 and the stride is 2 for illustrative purpose. As such, the first kernel 610 of 3×3 that is $$\begin{bmatrix} o7 & \dots & o9 \\ \vdots & \ddots & \vdots \\ r7 & \dots & r9 \end{bmatrix},$$

as shown in FIG. 6A. It is appreciated that in each subsequent figure the kernel is overlayed the image based on its size, stride, etc. Since the tensor output 330 is 3×2 and the stride is 2 then the kernel 612 of 3×3 is $$\begin{bmatrix} o9 & \dots & o11 \\ \vdots & \ddots & \vdots \\ r9 & \dots & r11 \end{bmatrix},$$

as shown in FIG. 6B. Similarly, the kernel 614 of 3×3 is $$\begin{bmatrix} r7 & \dots & r9 \\ \vdots & \ddots & \vdots \\ t7 & \dots & t9 \end{bmatrix},$$

as shown in FIG. 6C. Similarly, the kernel 616 of 3×3 is $$\begin{bmatrix} r9 & \dots & r11 \\ \vdots & \ddots & \vdots \\ t9 & \dots & t11 \end{bmatrix},$$

as shown in FIG. 6D. Moreover, the kernel 618 of 3×3 is $$\begin{bmatrix} t7 & \dots & t9 \\ u7 & \dots & u9 \\ 0 & \dots & 0 \end{bmatrix},$$

as shown in FIG. 6E and kernel 620 of 3×3 is $$\begin{bmatrix} t9 & \dots & t11 \\ u9 & \dots & u11 \\ 0 & \dots & 0 \end{bmatrix},$$

as shown in FIG. 6F. In this example, since the intermediate tensor size is 6×16, the bottom row of kernels 618 and 620 are empty and as such is padded with a value (in this example 0s entered). Once the intermediate tensors 610, 612, 614, 616, 618, and 620 are put together the intermediate tensor 622 for the third slice is formed, as shown in FIG. 6G. Slice 3 of the image 200B may be formed by applying a kernel size of 3×3 and stride of 2 to the image 200B in order to form the tensor 622, as shown in FIG. 6G. In this example, the first kernel 3×3 applied to the image 200B and forms $o_7$ of the intermediate tensor 622. In this example, $$o_7 = \begin{bmatrix} p13 & \dots & p15 \\ \vdots & \ddots & \vdots \\ b12 & \dots & b14 \end{bmatrix}.$$

Since the intermediate tensor 622 includes 3 columns and the stride is 2, then $$o_8 = \begin{bmatrix} p15 & \dots & p17 \\ \vdots & \ddots & \vdots \\ b14 & \dots & b16 \end{bmatrix}, o_9 = \begin{bmatrix} p17 & \dots & p19 \\ \vdots & \ddots & \vdots \\ b16 & \dots & b18 \end{bmatrix},$$

$$o_{10} = \begin{bmatrix} p19 & \dots & p21 \\ \vdots & \ddots & \vdots \\ b18 & \dots & b20 \end{bmatrix}, \text{ and } o_{11} = \begin{bmatrix} p21 & \dots & p23 \\ \vdots & \ddots & \vdots \\ b20 & \dots & b22 \end{bmatrix}.$$

As illustrated, there is an overlap between $o_7$ and $o_8$, $o_8$ and $o_9$, $o_9$ and $o_{10}$, and further between $o_{10}$ and $o_{11}$. It is appreciated that a similar process is repeated to generate each of the elements of the intermediate tensor 622, i.e., $q_7 \dots, q_{11}. r_7, \dots, r_{11}, s_7, \dots, s_{11}, t_7, \dots, t_{11}$, and $u_7, \dots, u_{11}$. It is appreciated that there is an overlap between $q_7$ and $q_8$, $q_8$ and $q_9$, $q_9$ and $q_{10}$, and further between $q_{10}$ and $q_{11}$. It is appreciated that there is an overlap between $r_7$ and $r_8$, $r_8$ and $r_9$, $r_9$ and $r_{10}$, and further between $r_{10}$ and $r_{11}$. It is appreciated that there is an overlap between $s_7$ and $s_8$, $s_8$ and $s_9$, $s_9$ and $s_{10}$, and further between $s_{10}$ and $s_{11}$. It is appreciated that there is an overlap between $t_7$ and $t_8$, $t_8$ and $t_9$, to and $t_{10}$, and further between $t_{10}$ and $t_{11}$. It is appreciated that there is an overlap between $u_7$ and $u_8$, $u_8$ and $u_9$, $u_9$ and $u_{10}$, and further between $u_{10}$ and $u_{11}$.

It is appreciated that there is an overlap between $o_7$ and $q_7$, $q_7$ and $r_7$, $r_7$ and $s_7$, $s_7$ and $t_7$, and $t_7$ and $u_7$. Similarly, there is an overlap between $o_8$ and $q_8$, $q_8$ and $r_8$, $r_8$ and $s_8$, $s_8$ and $t_8$, and $t_8$ and $u_8$. Similarly, there is an overlap between $o_9$ and $q_9$, $q_9$ and $r_9$, $r_9$ and $s_9$, $s_9$ and $t_9$, and to and $u_9$. Similarly, there is an overlap between $o_{10}$ and $q_{10}$, $q_{10}$ and $r_{10}$, $r_{10}$ and $s_{10}$, $s_{10}$ and $t_{10}$, and $t_{10}$ and $u_{10}$. Similarly, there is an overlap between on and $q_{11}$, $q_{11}$ and $r_{11}$, $r_{11}$ and $s_{11}$, $s_{11}$ and $t_{11}$, and $t_{11}$ and $u_{11}$.

It is appreciated that slice 3 has an overlap region 699 with slice 2. In other words, tensor data $o_7$, $q_7$, $r_7$, $s_7$, $t_7$, and $u_7$ are present in both slice 2 and slice 3. For example, the data from slice 2 may have been duplicated and made available to slice 3. In this nonlimiting example, the overlap region 699 causes the same data to be processed both in slice 2 and slice 3, thereby eliminating the need to communicate data from one slice to another slice (i.e., removing the dependency), thereby enabling the slices to be performed in parallel and independent of one another. For example, slice 3 may be operated on by a subset of processing tiles while slice 2 is being operated on in parallel by another subset of processing tiles. It is further appreciated that slice 3 may be operated on independent of slice 1. In other words, slices 1, 2 and 3 may be operated on independent of one another and in parallel. It is further appreciated that since the slices are independent of one another they may be executed in sequential manner if desired or even in any chronological ordering, as desired. Moreover, it is appreciated that since the image is divided into smaller sub-images then the data associated with each sub-image may be stored entirely within the OCMs of the processing tiles, thereby eliminating the need to move data back and forth between the OCMs and an external memory such as a DDR memory.

Figures 7A, 7B, 7C:
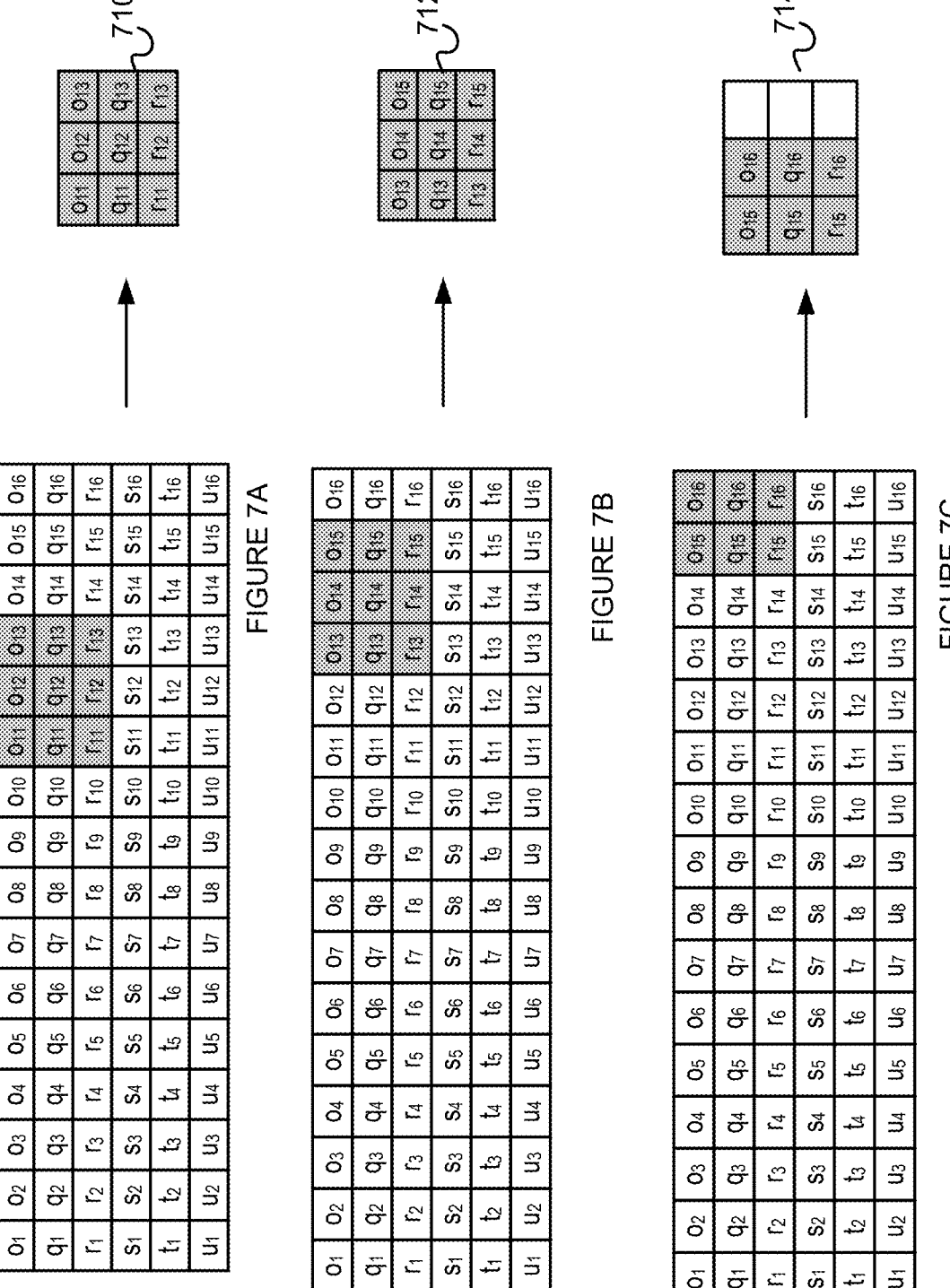
Figures 7G, 7H, 7I:
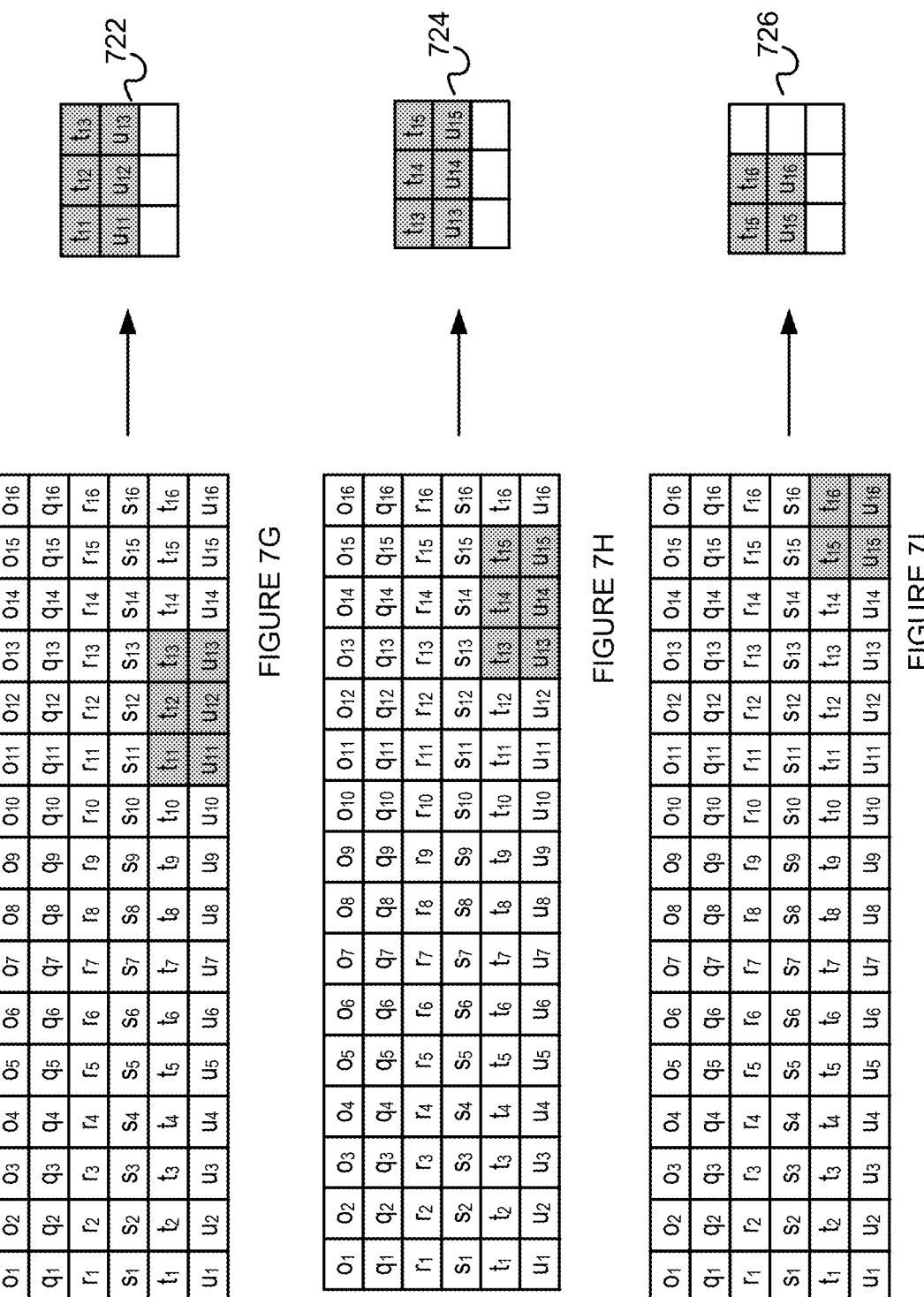

Referring now to FIGS. 7A-7J illustrate the manner in which the tensor output 340 (i.e., fourth slice) is generated from the intermediate tensor (shown in FIG. 2C). In this example, the kernel size is 3×3 and the stride is 2 for illustrative purpose. As such, the first kernel 710 of 3×3 that is $$\begin{bmatrix} o11 & \cdots & o13 \\ \vdots & \ddots & \vdots \\ r11 & \cdots & r13 \end{bmatrix},$$

as shown in FIG. 7A. It is appreciated that in each subsequent figure the kernel is overlayed the image based on its size, stride, etc. Since the tensor output 330 is 3×3 and the stride is 2 then the kernel 712 of 3×3 is $$\begin{bmatrix} o13 & \cdots & o15 \\ \vdots & \ddots & \vdots \\ r13 & \cdots & r15 \end{bmatrix},$$

as shown in FIG. 7B. Similarly, the kernel 714 of 3×3 is $$\begin{bmatrix} o15 & o16 & 0 \\ q15 & q16 & \vdots \\ r15 & r16 & 0 \end{bmatrix},$$

as shown in FIG. 7C. In this example, since the intermediate tensor size is 6×16, the right column of kernel 714 is empty and as such is padded with a value (in this example 0s entered). Kernel 716 of 3×3 is $$\begin{bmatrix} r11 & \cdots & r13 \\ \vdots & \ddots & \vdots \\ t11 & \cdots & t13 \end{bmatrix},$$

as shown in FIG. 7D. Moreover, the kernel 718 of 3×3 is $$\begin{bmatrix} r13 & \cdots & r15 \\ \vdots & \ddots & \vdots \\ t13 & \cdots & t15 \end{bmatrix},$$

as shown in FIG. 7E and kernel 720 of 3×3 is $$\begin{bmatrix} r15 & r16 & 0 \\ s15 & s16 & \vdots \\ t15 & t16 & 0 \end{bmatrix},$$

as shown in FIG. 7F. In this example, since the intermediate tensor size is 6×16, the right column of kernel 720 is empty and as such is padded with a value (in this example 0s entered). Kernels 722, 724, and 726 are also determined to be $$\begin{bmatrix} t11 & \cdots & t13 \\ u11 & \cdots & u13 \\ 0 & \cdots & 0 \end{bmatrix}, \begin{bmatrix} t13 & \cdots & t15 \\ u13 & \cdots & u15 \\ 0 & \cdots & 0 \end{bmatrix}, \text{ and } \begin{bmatrix} t15 & t16 & 0 \\ u15 & u16 & 0 \\ 0 & 0 & 0 \end{bmatrix},$$

respectively.

Figure 7J:
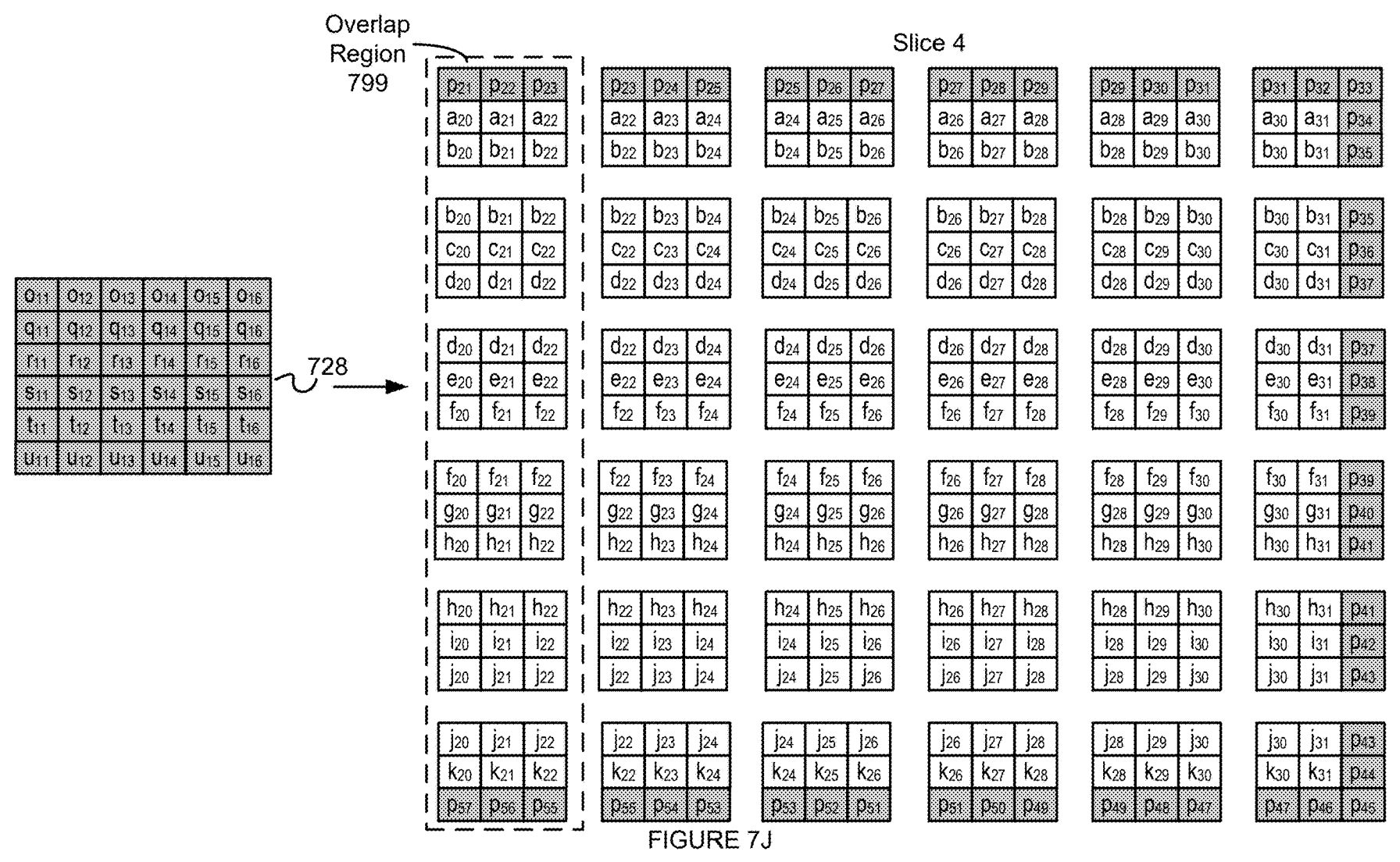

Once the intermediate tensors 710, 712, 714, 716, 718, 720, 722, 724 and 726 are put together the intermediate tensor 728 for the fourth slice is formed, as shown in FIG. 7J. Slice 4 of the image 200B may be formed by applying a kernel size of 3×3 and stride of 2 to the image 200B in order to form the tensor 728, as shown in FIG. 7J. In this example, the first kernel 3×3 applied to the image 200B and forms on of the intermediate tensor 728. In this example, $$o_{11} = \begin{bmatrix} p21 & \cdots & p23 \\ \vdots & \ddots & \vdots \\ b20 & \cdots & b22 \end{bmatrix}.$$

Since the intermediate tensor 728 includes 3 columns and the stride is 2, then $$o_{12} = \begin{bmatrix} p23 & \cdots & p25 \\ \vdots & \ddots & \vdots \\ b22 & \cdots & b24 \end{bmatrix}, o_{13} = \begin{bmatrix} p25 & \cdots & p27 \\ \vdots & \ddots & \vdots \\ b24 & \cdots & b26 \end{bmatrix}, o_{14} = \begin{bmatrix} p27 & \cdots & p29 \\ \vdots & \ddots & \vdots \\ b26 & \cdots & b28 \end{bmatrix},$$

$$o_{15} = \begin{bmatrix} p29 & \cdots & p31 \\ \vdots & \ddots & \vdots \\ b28 & \cdots & b30 \end{bmatrix}, \text{ and } o_{16} = \begin{bmatrix} p31 & \cdots & p33 \\ \vdots & \ddots & \vdots \\ b30 & \cdots & b35 \end{bmatrix}.$$

As illustrated, there is an overlap between $o_{11}$ and $o_{12}$, $o_{12}$ and $o_{13}$, $o_{13}$ and $o_{14}$, $o_{14}$ and $o_{15}$, and further between $o_{15}$ and $o_{16}$. It is appreciated that a similar process is repeated to generate each of the elements of the intermediate tensor 728, i.e., $q_{11} \ldots, q_{16}$. $r_{11}, \ldots, r_{16}$, $s_{11}, \ldots, s_{16}$, $t_{11}, \ldots, t_{16}$, and $u_{11}, \ldots, u_{16}$. It is appreciated that there is an overlap between $q_{11}$ and $q_{12}$, $q_{12}$ and $q_{13}$, $q_{13}$ and $q_{14}$, $q_{14}$ and $q_{15}$, and further between $q_{15}$ and $q_{16}$. It is appreciated that there is an overlap between $r_{11}$ and $r_{12}$, $r_{12}$ and $r_{13}$, $r_{13}$ and $r_{14}$, $r_{14}$ and $r_{15}$, and further between $r_{15}$ and $r_{16}$. It is appreciated that there is an overlap between $s_{11}$ and $s_{12}$, $s_{12}$ and $s_{13}$, $s_{13}$ and $s_{14}$, $s_{14}$ and $s_{15}$, and further between $s_{15}$ and $s_{16}$. It is appreciated that there is an overlap between $t_{11}$ and $t_{12}$, $t_{12}$ and $t_{13}$, $t_{13}$ and $t_{14}$, $t_{14}$ and $t_{15}$, and further between $t_{15}$ and $t_{16}$. It is appreciated that there is an overlap between $u_{11}$ and $u_{12}$, $u_{12}$ and $u_{13}$, $u_{13}$ and $u_{14}$, $u_{14}$ and $u_{15}$, and further between $u_{15}$ and $u_{16}$.

It is appreciated that there is an overlap between $o_{11}$ and $q_{11}$, $q_{11}$ and $r_{11}$, $r_{11}$ and $s_{11}$, $s_{11}$ and $t_{11}$, and $t_{11}$ and $u_{11}$. Similarly, there is an overlap between $o_{12}$ and $q_{12}$, $q_{12}$ and $r_{12}$, $r_{12}$ and $s_{12}$, $s_{12}$ and $t_{12}$, and $t_{12}$ and $u_{12}$. Similarly, there is an overlap between $o_{13}$ and $q_{13}$, $q_{13}$ and $r_{13}$, $r_{13}$ and $s_{13}$, $s_{13}$ and $t_{13}$, and $t_{13}$ and $u_{13}$. Similarly, there is an overlap between $o_{14}$ and $q_{14}$, $q_{14}$ and $r_{14}$, $r_{14}$ and $s_{14}$, $s_{14}$ and $t_{14}$, and $t_{14}$ and $u_{14}$. Similarly, there is an overlap between $o_{15}$ and $q_{1}$, $q_{15}$ and $r_{15}$, $r_{15}$ and $s_{15}$, $s_{15}$ and $t_{15}$, and $t_{15}$ and $u_{15}$. Similarly, there is an overlap between $o_{16}$ and $q_{16}$, $q_{16}$ and $r_{16}$, $r_{16}$ and $s_{16}$, $s_{16}$ and $t_{16}$, and $t_{16}$ and $u_{16}$.

It is appreciated that slice 4 has an overlap region 799 with slice 3. In other words, tensor data $o_{11}$, $q_{11}$, $r_{11}$, $s_{11}$, $t_{11}$, and $u_{11}$ are present in both slice 3 and slice 4. In some nonlimiting example, the data in the overlap region 799 of slice 4 is duplication of data from slice 3. In this nonlimiting example, the overlap region 799 causes the same data to be processed both in slice 3 and slice 4, thereby eliminating the need to communicate data from one slice to another slice (i.e., removing the dependency), thereby enabling the slices to be performed in parallel and independent of one another. For example, slice 3 may be operated on by a subset of processing tiles while slice 4 is being operated on in parallel by another subset of processing tiles. It is further appreciated that slice 4 may be operated on independent of slice 1 and/or slice 2. In other words, slices 1, 2, 3 and 4 may be operated on independent of one another and in parallel. It is further appreciated that since the slices are independent of one another they may be executed in sequential manner if desired or even in any chronological ordering, as desired. Moreover, it is appreciated that since the image is divided into smaller sub-images then the data associated with each sub-image may be stored entirely within the OCMs of the processing tiles, thereby eliminating the need to move data back and forth between the OCMs and an external memory such as DDR memory.

Figure 8A:
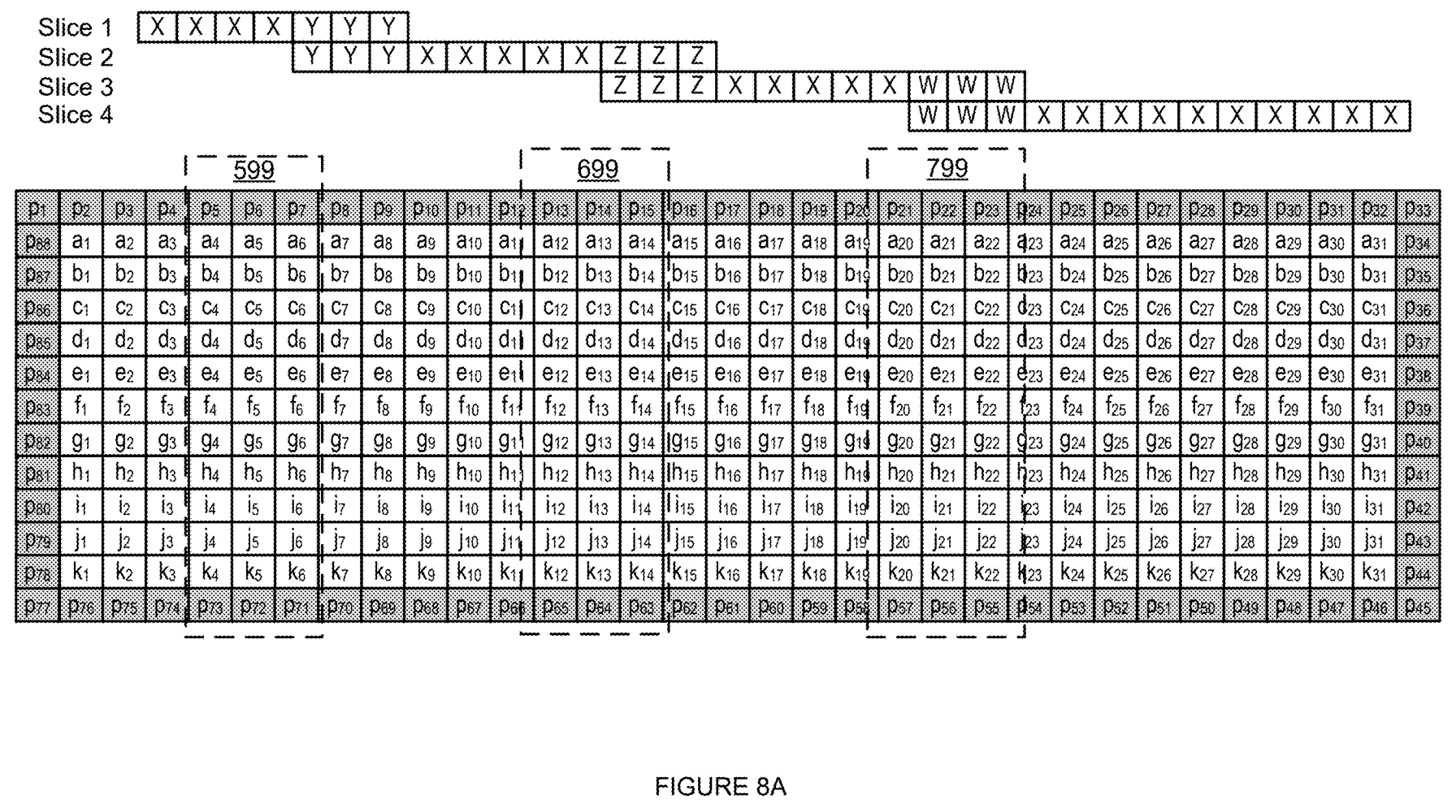

Referring now to FIG. 8A, the padded image 200B is shown with slices 1-4 illustrated and their respective overlap regions 599, 699, and 799. As illustrated, slice 1 when operated on includes operation on data from columns x and y where y is the overlap data with slice 2. As illustrated, slice 2 when operated on includes operation on data from columns y, x, and z, where y is the overlap data with slice 1 and where z is the overlap data with slice 3. As illustrated, slice 3 when operated on includes operation on data from columns z, x, and w, where z is the overlap data with slice 2 and where w is the overlap data with slice 4. As illustrated, slice 4 when operated on includes operation on data from columns w and x where w is the overlap data with slice 3. It is appreciated that since there is an overlap of data between each slices, the need to communicate data between slices is eliminated because each two slices operate on certain data that is common to both slices and therefore have no need to communicate data from one slice to the next and any dependency between slices is removed.

Figure 8B:
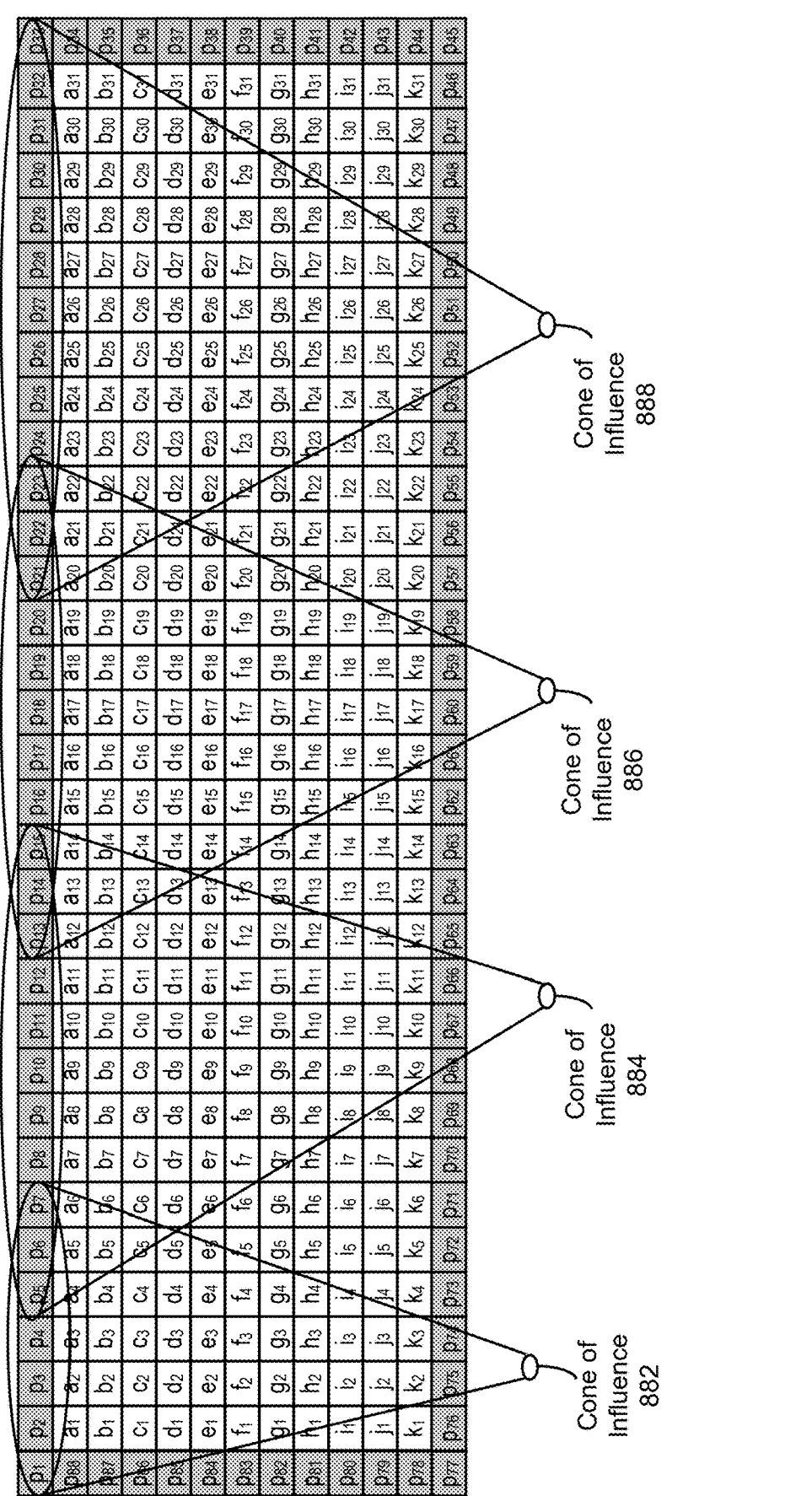

Referring now to FIG. 8B, cone of influence 882-888 associated with slices 1-4 are shown. There is an overlap between each two adjacent slices. For example, columns associated with p5-p7 is an overlap between slices 1-2, columns associated with p13-p15 is an overlap between slices 2-3, and columns associated with p21-p23 is an overlap between slices 3-4. It is appreciated that the increase in size (in height and/or width) is due to the kernel sizes used in each of the convolution and pooling layers.

It is appreciated that the created slices of the image may be transmitted to respective OCMs of the processing tiles of an ML hardware, as described in FIG. 1, for storage thereof. For example, the first slice may be transmitted to OCMs of a first set of processing tiles, the second slice may be transmitted to OCMs of a second set of processing tiles, etc. Once stored, each set of processing tiles may process its respective slice independent of other slices (i.e., in parallel, in sequential ordering, out of chronological ordering, etc.). Moreover, since the image is partitioned into sub-images that are small enough they can be stored within the OCMs of their respective processing tiles without having to store any intermediate data into other memory components, e.g., an external DDR memory, or to receive any data from other components, e.g., another external DDR memory. Furthermore, since the sub-images are independent of one another they may be processed in parallel without a need to communicate any intermediate data from one slice to another slice. It is further appreciated that since the slices are independent of one another they may be executed in sequential manner if desired or even in any chronological ordering, as desired, without a need to communicate any intermediate data from one slice to another slice. Once each slice is processed completely by its designated processing tiles, the output may be put together (concatenated like a puzzle) to generate the final output results.

It is appreciated that as the amount of data, e.g., intermediate tensor data, grows the more efficient is the methodology because the amount of nonoverlapping data increases in comparison to the overlapping data. It is appreciated that the amount of increase in data processing due to overlapping region becomes a small cost to pay in exchange for eliminating the dependency between the slices (e.g., savings in eliminating data movement outweighs the small increase in the amount of processing resulting from the overlapping regions).

As described above, independent slices (graphs) result by making data associated with the edges of each slice available, which are output of a previous layer to the current layer (i.e., from slice 1 to slice 2, from slice 2 to slice 3, from slice 3 to slice 4). In some embodiments, the size of the overlap is a function of the actual network and its individual convolution and pooling layers. It is appreciated that as described above, in order to determine the size of the overlap, the process starts from the output tensor and looks backwards towards the intermediate tensor(s) and finally to the input tensor. It is appreciated that due to the overlapping region, more data is being processed (a larger image than the original image) but efficiencies are being achieved by eliminating data movement, as described above. The additional overlap may be calculated based on the image size, the number of layers in a stage and the type of convolutions (i.e., kernel size and stride). As the number of slices applied to a stage can be altered, the algorithm and/or compiler may balance additional computation vs memory resource needs.

It is appreciated that in the nonlimiting example above, a 2-dimensional CNN was discussed for illustration purposes only and should not be construed as limiting the scope of the embodiments. Moreover, as described above, the slicing was done in a width direction for illustrative purposes and should not be construed as limiting the scope of the embodiments. For example, the slicing may be done in a height direction. It is further appreciated that a similar process may be performed for a 1-dimensional or a 3-dimensional CNN.

It is appreciated that the embodiments described above did not contain branching. However, some CNN networks may contain branching. When branching is present, the compiler may need to perform additional computation and determination since each side of a branch may have different requirements. It is appreciated that the side with the larger cone may be considered as the limit for both sides of the branch, therefore dictating the overall shape of the cone. As a nonlimiting example, if the first stage of ResNet contains 3 branches, then at the end of each branch, the compiler or algorithm looks from the output tensor to the input tensor, where the end of a branch is beginning of another branch, and the compiler or the algorithm determines which side has a larger required cone. Moreover, the compiler or the algorithm determines the mapping of the required smaller cone to the larger cone of the side for the side with the smaller cone requirements. It is appreciated that all data may be local to the sub-graph when the smaller cone is a subsection of the larger cone.

Referring now to FIG. 9, a flowchart of an example of a process for partitioning an image according to one aspect of the present embodiments is shown. At step 902, a size associated with a tensor output for an image being processed in a convolutional neural network (CNN) is determined, as described above with respect to FIGS. 1-2D. At step 904, the tensor output is divided into a first tensor output portion and a second tensor output portion, wherein the first tensor output portion is associated with a first slice associated with the image and wherein the second tensor output portion is associated with a second slice associated with the image, as described above in FIGS. 3A-3B. At step 906, a first intermediate tensor portion is generated, from an intermediate tensor (e.g., tensor 416), based on the first tensor output portion, as described in FIGS. 4A-7J. It is appreciated that the first intermediate tensor portion may be generated by applying a kernel size and a stride to the intermediate tensor that would generate the first tensor output portion.

At step 908, a second intermediate tensor portion is generated, from the intermediate tensor, based on the second tensor output portion (e.g., tensor 522), as described in FIGS. 4A-7J. At step 910, the first slice associated with the image is created based on the first intermediate tensor portion, as described in FIGS. 4A-7J. It is appreciated that the first slice may be created by applying the kernel size and the stride to the image that would generate the first intermediate tensor portion (e.g., see FIGS. 4A-4D, FIGS. 5A-5G, FIGS. 6A-6G, FIGS. 7A-7J). At step 912, the second slice associated with the image is created based on the second intermediate tensor portion, as described in FIGS. 4A-7J. It is appreciated that the first slice associated with the image contains an overlap region data that is common with the second slice associated with the image, as described in FIGS. 4A-8B.

It is appreciated that the created slices may be transmitted to their respective processing tiles for processing and local storage thereof. For example, the first slice may be transmitted to a first set of processing tiles and may be locally stored in the OCMs of the first set of processing tiles. Similarly, the second slice may be transmitted to a second set of processing tiles and may be locally stored in the OCMs of the second set of processing tiles. It is appreciated that the second slice may be operated on without data being communicated to it from the first slice and vice versa. It is further appreciated that snice the image is partitioned to sub-images then the entire slice and any intermediate data being generated from that slice can be stored locally within the OCMs of its designated set of processing tiles, e.g., any intermediate data generated during processing of the first slice is stored in the first set of processing tiles exclusively without having to store any portion of it externally in a DDR. Moreover, it is appreciated that no data needs to be communicated from processing of one slice to another slice, e.g., slice one can be operated on independently and in parallel of slice two. It is further appreciated that since the slices are independent of one another they may be executed in sequential manner if desired or even in any chronological ordering, as desired.

Referring now to FIG. 10, a flowchart of an example of another process for partitioning an image according to one aspect of the present embodiments is shown. a flowchart of an example of a process for partitioning an image according to one aspect of the present embodiments. At step 1002, an image to be processed in a CNN is received. At step 1004, a plurality of slices associated with the image is generated based on one or more of a tensor size, a kernel size and a stride value, wherein at least two slices of the plurality of slices each have a region with a same data content, as described above in FIGS. 2A-8B. At step 1006, each slice of the at least two slices is processed independent of one another.

It is appreciated that an output tensor may be divided, wherein each division of the divided output tensor is associated with one slice of the plurality of slices, as described in FIGS. 3A-3B. In some embodiments, each division of the divided output tensor may be mapped to an intermediate tensor to generate a plurality of intermediate tensor divisions, e.g., tensors 416, 522, 622, and 728, wherein the mapping is based on the kernel size and the stride value, as described in FIGS. 4A-7J. It is appreciated that the plurality of slices may be generated by mapping each intermediate tensor division of the plurality of intermediate tensor divisions to the image, wherein the mapping is based on the kernel size and the stride value, as described in FIGS. 4A-7J. It is appreciated that the data associated with each slice may be transmitted to a respective set of processing tiles and may be stored in their OCMs locally (exclusively). It is appreciated that each slice of the plurality of slices may be independently processable by their respective processing tiles without requiring data to be communicated to it from another slice.

It is appreciated that the embodiments described so far are directed to creating slices and creating an overlapping region to make each slice completely independent of the other slices, thereby enabling the slices to be processed in parallel without a need to communicate any data from one to another. It is further appreciated that since the slices are independent of one another they may be executed in sequential manner if desired or even in any chronological ordering, as desired. However, as described above, since the overlap region is present in both adjacent slices, the amount of data and computation associated therewith increases. In other words, even though the amount of data movement to/from an external to the processing tiles is reduced and while different slices may be processed independent from one another, the amount of computation may have been increased resulting from the duplication of data. In some embodiments, a balance between dependency of slices on one another and the amount of processing may be struck. For example, the amount of processing may be reduced by creating dependency between the slices in a special fashion, as described below. It is appreciated that although the following approach may introduce certain dependencies between different slices, certain operations within each of the slices may be executed independently, i.e., enabling them to be executed in parallel, in sequential manner, in a different chronological ordering, etc. The following example illustrates the proposed strategy for a two-dimensional convolution (similar to that described above) that contains three layers where the first layer is the input image, the second layer is the intermediate tensor, and the third layer is the output tensor.

Figure 11A:
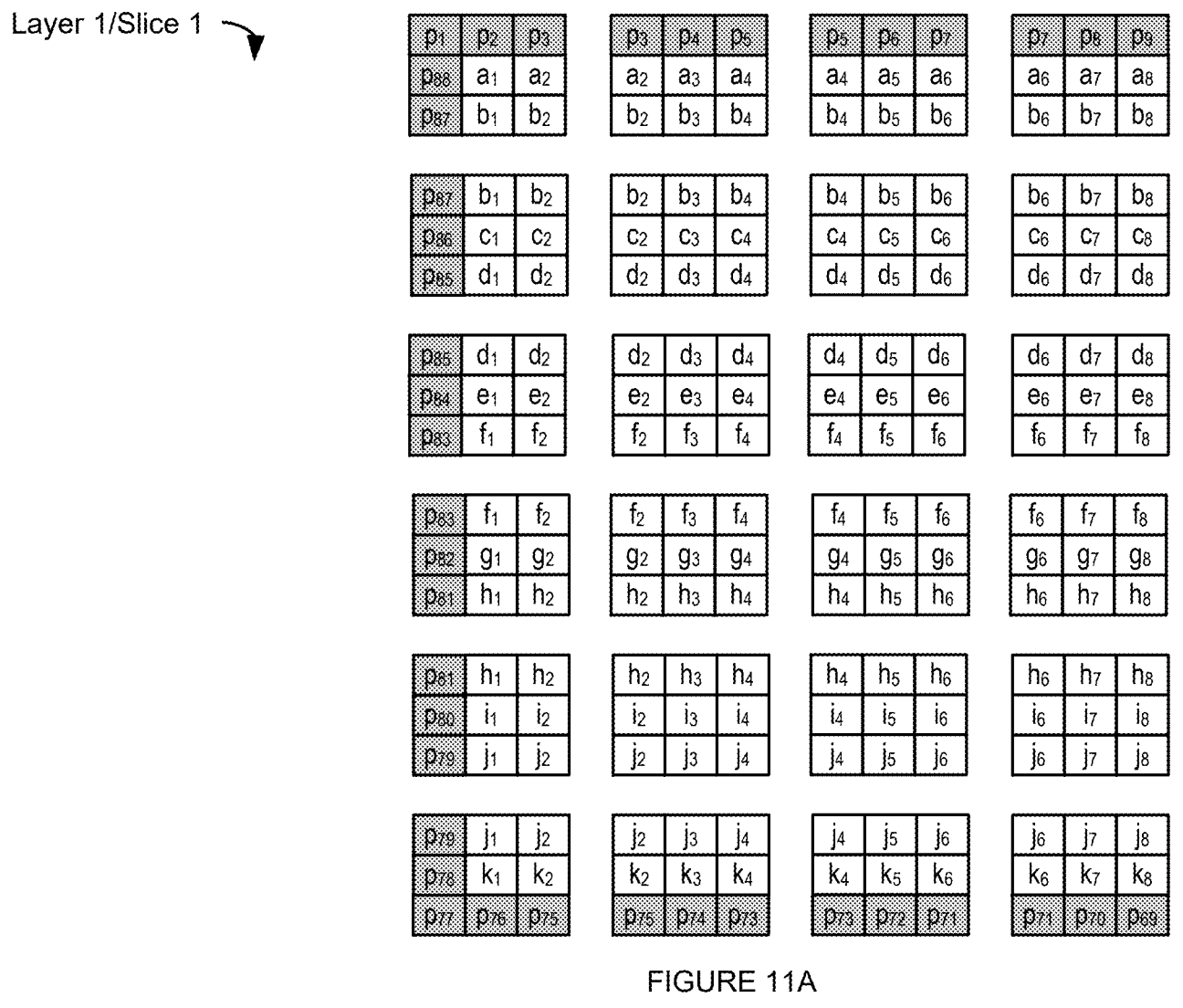
Figure 11B:
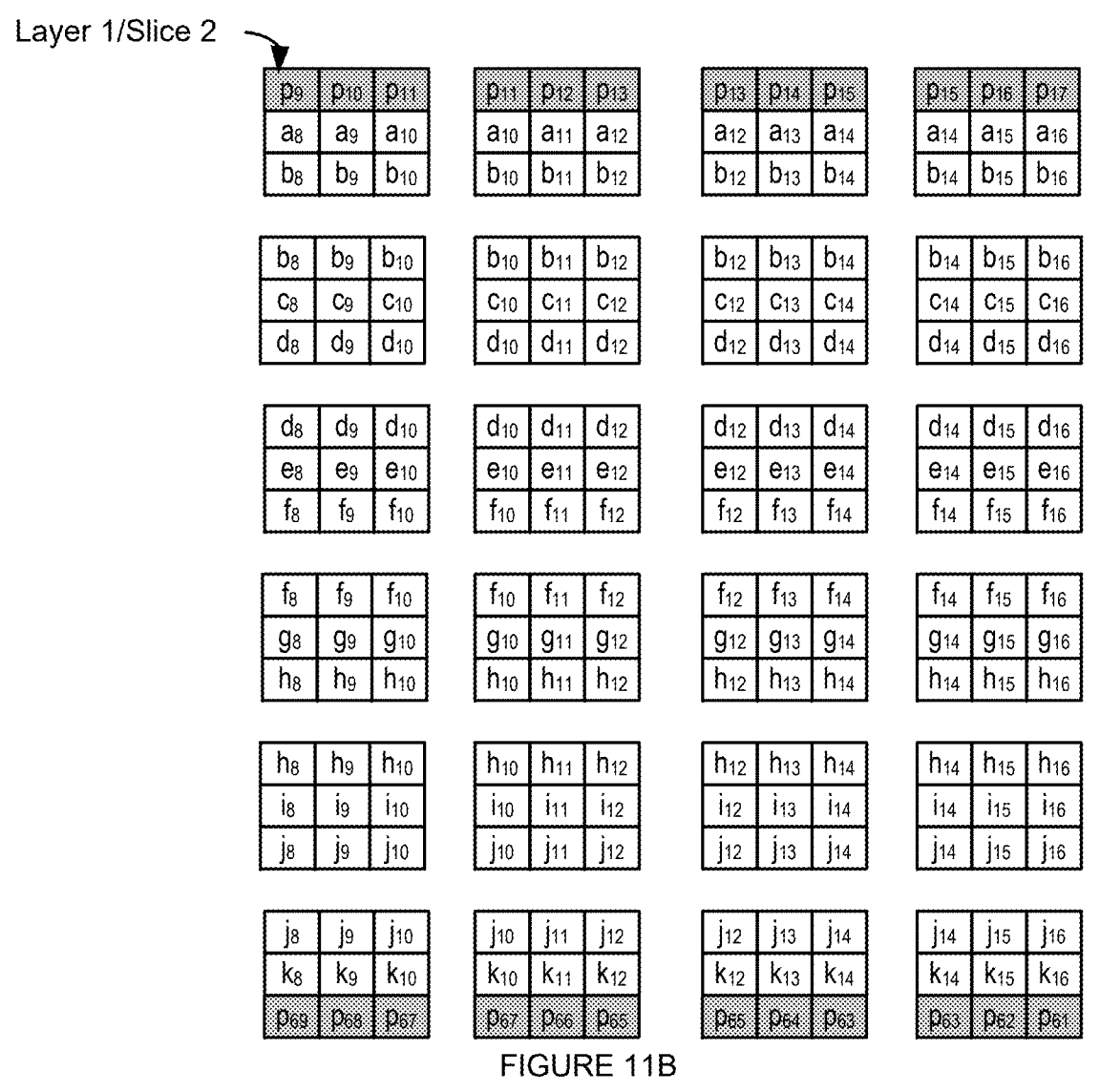
Figure 11C:
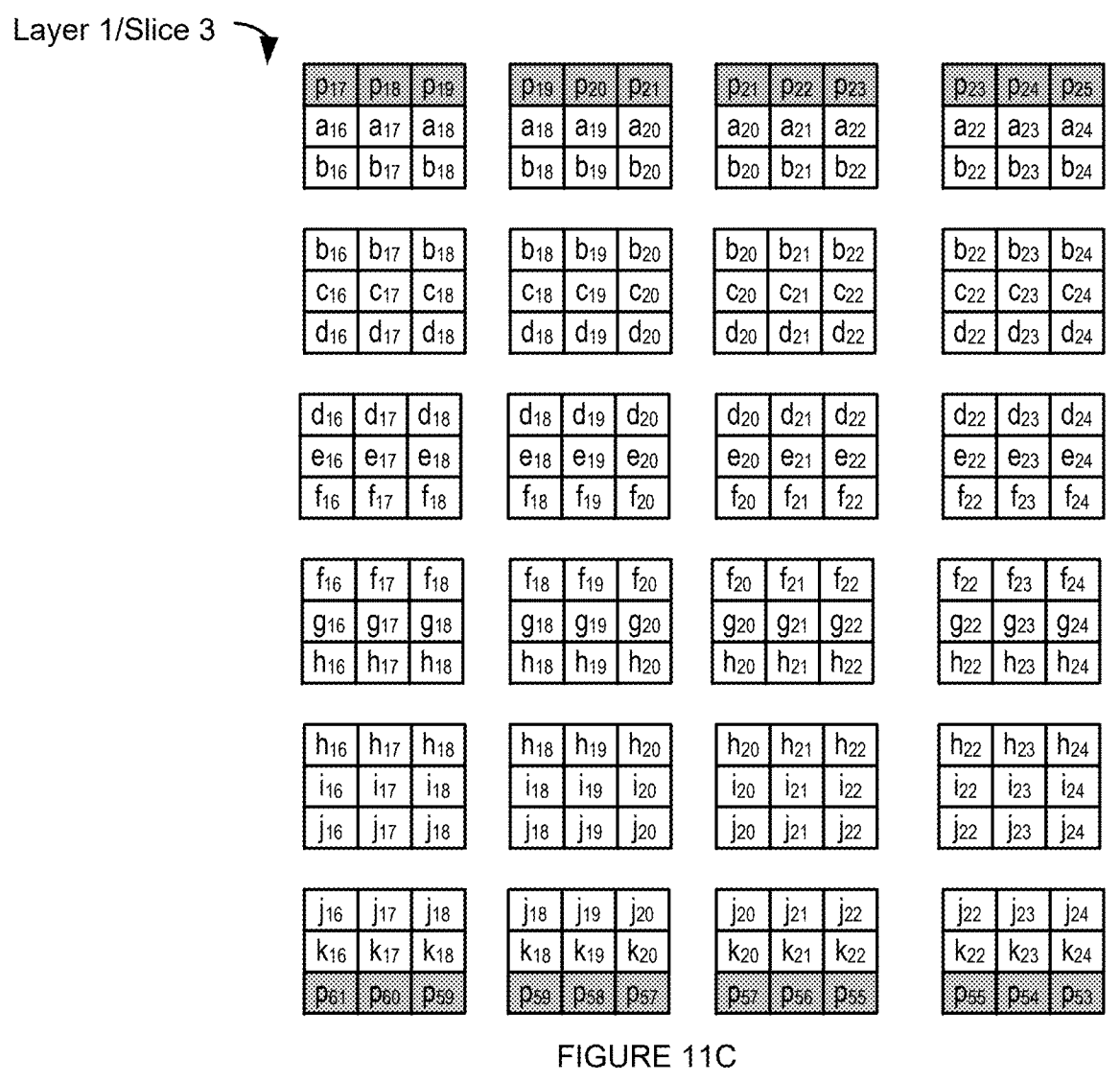
Figure 11D:
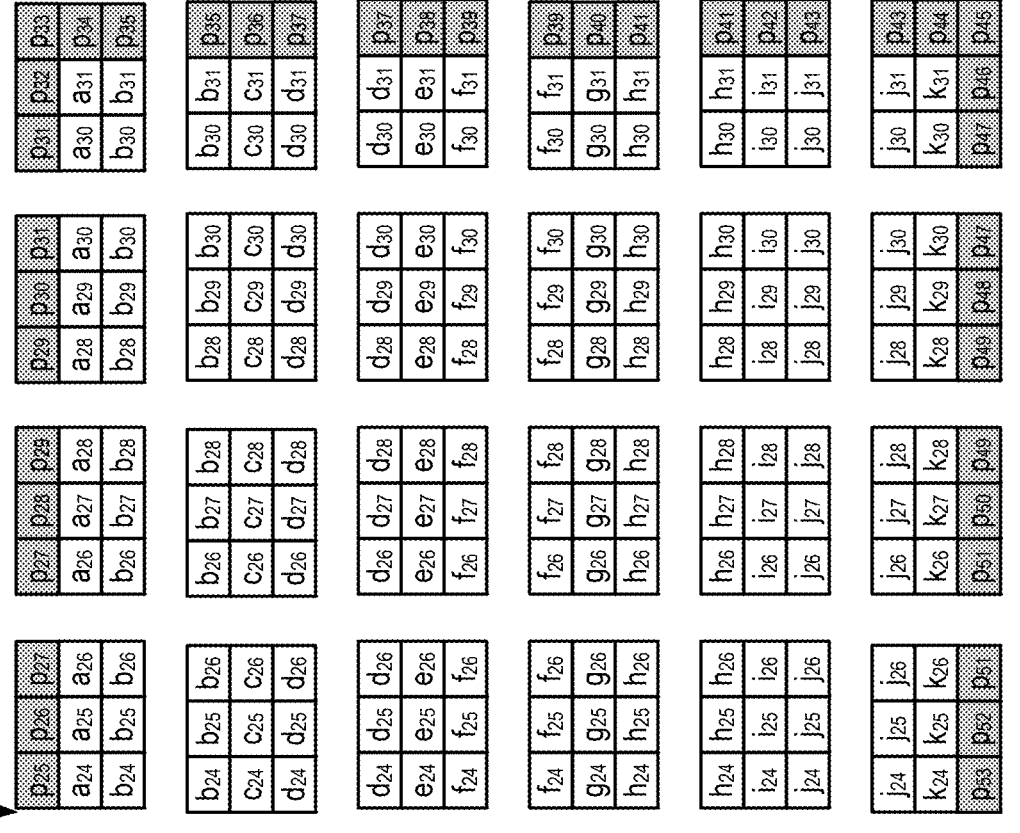

FIGS. 11A-D are input or image tensor data as input of the first convolution layer of a two-layer example. It is appreciated that a compiler or an algorithm may determine that the processing tiles of an ML hardware (for example as shown in FIG. 1) may accommodate data associated with the input image (as sliced and as illustrated in FIGS. 11A-11D). Referring specifically to FIG. 11A, tensor data for slice 1 is shown. Referring now to FIG. 11B, the tensor data for slice 2 is shown along with tensor data being made available from slice 1. Referring now to FIG. 11C, the tensor data for slice 3 is shown along with tensor data being made available from slice 2. Referring now to FIG. 11D, the tensor data for slice 4 is shown along with tensor data being made available from slice 3. The result of the processing from each slice may be ultimately concatenated together to form the processed result of the image, i.e., output tensor shown in FIG. 2D.

Accordingly, as illustrated in FIGS. 11A-11D, inter-graph communication and a properly staged execution of the sub-graphs is performed in order to have data (from a previous slice) available that is required for a given sub-graph (to a next slice). As illustrated, a sweep like algorithm is used which starts from the outer most sub-graph and sequentially calculates the adjacent sub-graph.

Referring now to FIG. 12A, the intermediate tensor (as shown in FIG. 2C) that is divided to create slices associated with the image according to some embodiments is shown. In other words, FIG. 12A illustrates the tensor for layer 2 of the two-dimensional convolution in this example. It is appreciated that in some embodiments a compiler or an algorithm may determine that the processing tiles of an ML hardware (for example as shown in FIG. 1) may accommodate data associated with the intermediate tensor that includes $$\begin{bmatrix} o1 & \cdots & o4 \\ \vdots & \ddots & \vdots \\ u1 & \cdots & u4 \end{bmatrix}.$$

As such, $$\begin{bmatrix} o1 & \cdots & o4 \\ \vdots & \ddots & \vdots \\ u1 & \cdots & u4 \end{bmatrix}$$

may be assigned to slice 1. Similar to the embodiments described in FIGS. 2A-10, it is presumed that the kernel size is 3×3 and the stride value is 2 for illustrative purposes that should not be construed as limiting the scope. For example, a kernel size that is different from 3×3 and/or a stride value that is different from 2 may be used. It is appreciated that other slices may also be determined similar to that of slice 1. In this nonlimiting example, the compiler may determine slice 2 as $$\begin{bmatrix} o5 & \cdots & o8 \\ \vdots & \ddots & \vdots \\ u5 & \cdots & u8 \end{bmatrix},$$

slice 3 as $$\begin{bmatrix} o9 & \cdots & o12 \\ \vdots & \ddots & \vdots \\ u9 & \cdots & u12 \end{bmatrix},$$

and slice 4 as $$\begin{bmatrix} o13 & \cdots & o16 \\ \vdots & \ddots & \vdots \\ u13 & \cdots & u16 \end{bmatrix}.$$

In other words, the slices are generated in a load balanced fashion (i.e., equal slices).

Figure 12B:
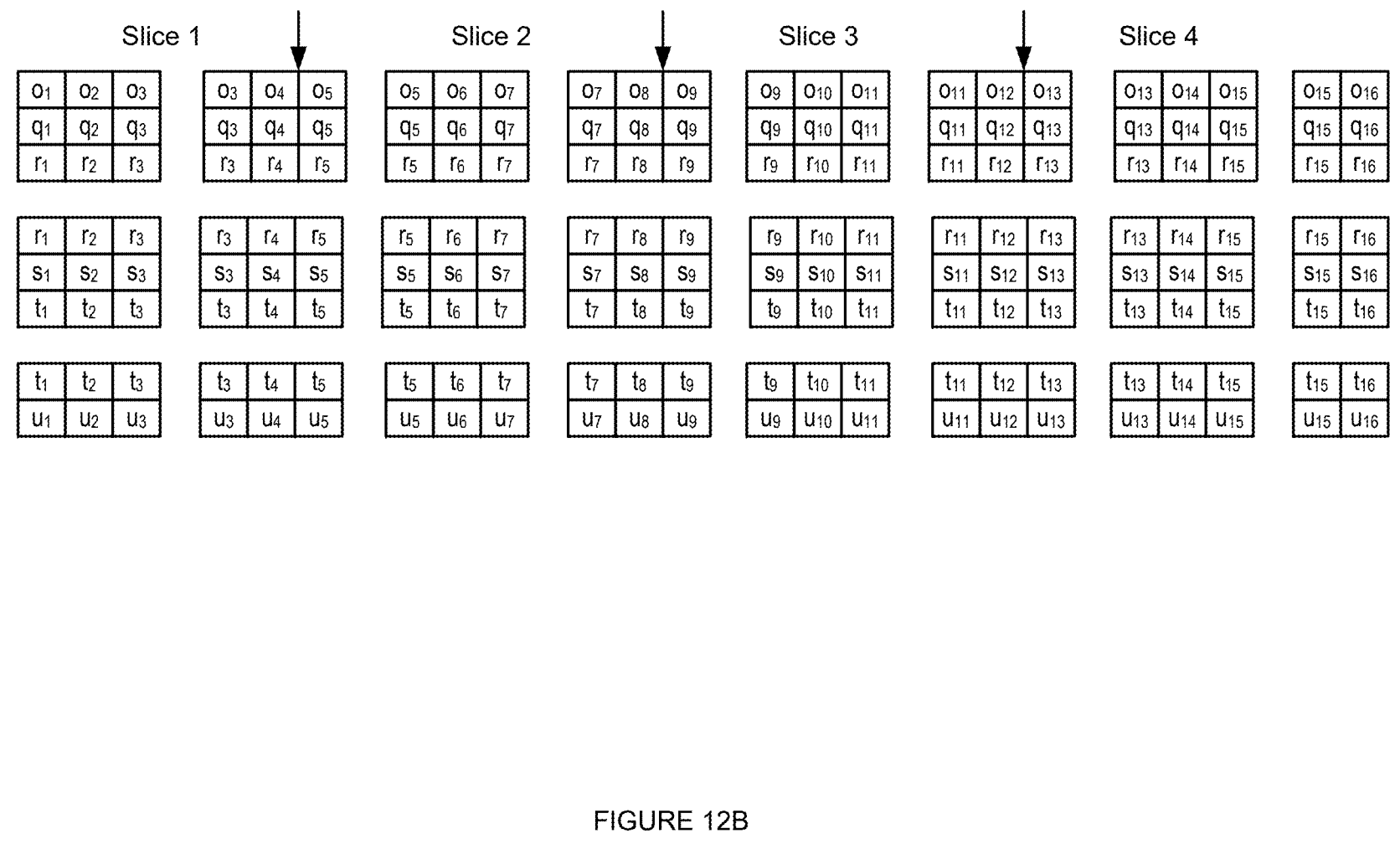

Referring now to FIG. 12B, processing of the intermediate tensor for processing layer 2 according to some embodiments is shown. In this nonlimiting example, since the kernel size is 3 and the stride value is 2, then tensors $$\begin{bmatrix} o1 & \cdots & o3 \\ \vdots & \ddots & \vdots \\ r1 & \cdots & r3 \end{bmatrix}, \begin{bmatrix} r1 & \cdots & r3 \\ \vdots & \ddots & \vdots \\ t1 & \cdots & t3 \end{bmatrix}, \text{and} \begin{bmatrix} t1 & \cdots & t3 \\ u1 & \cdots & u3 \\ 0 & \cdots & 0 \end{bmatrix},$$

can be processed entirely independent of other slices, e.g., slice 2, slice 3, or slice 4. It is appreciated that in tensor $$\begin{bmatrix} t1 & \cdots & t3 \\ u1 & \cdots & u3 \\ 0 & \cdots & 0 \end{bmatrix},$$

the bottom row is empty since a 3×3 kernel is used with a stride value of 2, and as such a row of zeros is inserted for the bottom row. As illustrated, processing the next set of tensors, e.g., $$\begin{bmatrix} o3 & \cdots & o5 \\ \vdots & \ddots & \vdots \\ r3 & \cdots & r5 \end{bmatrix}, \begin{bmatrix} r3 & \cdots & r5 \\ \vdots & \ddots & \vdots \\ t3 & \cdots & t5 \end{bmatrix}, \text{and} \begin{bmatrix} t3 & \cdots & t5 \\ u3 & \cdots & u5 \\ 0 & \cdots & 0 \end{bmatrix},$$

requires data from two adjacent slices, i.e., slice 1 and 2. In other words, data from one slice should be passed on to its adjacent slice in order to complete its processing. In this example, tensor data $$\begin{bmatrix} o3 & o4 \\ \vdots & \vdots \\ u3 & u4 \end{bmatrix}$$

from slice 1 is needed by slice 2. As such, tensor data $$\begin{bmatrix} o3 & o4 \\ \vdots & \vdots \\ u3 & u4 \end{bmatrix}$$

may be saved in a memory component, e.g., OCMs of processing tiles of ML hardware, as shown in FIG. 1, such that when slice 2 is being processed the data needed from slice 1 becomes available. In yet another example, the tensor data $$\begin{bmatrix} o3 & o4 \\ \vdots & \vdots \\ u3 & u4 \end{bmatrix}$$

may be stored in a memory component other than OCMs of the processing tiles, e.g., DDR component that is external to the ML hardware. In some nonlimiting example, the processing tiles processing slice 1 may also process the tensor data $$\begin{bmatrix} o3 & o4 \\ \vdots & \vdots \\ u3 & u4 \end{bmatrix}$$

to obtain processed partial data (e.g., locally calculated parts) where the processed partial data is stored (e.g., in OCMs of the processing tiles, external DDR, etc.) to make it available for processing when slice 2 is being processed. Partially processing the data available in slice 1 leverages available processing elements when slice 1 is being processed to alleviate processing burden when slice 2 is being processed. In other words, the tensor data $$\begin{bmatrix} o3 & o4 \\ \vdots & \vdots \\ u3 & u4 \end{bmatrix}$$

and/or the processed partial data by slice 1 on the tensor data $$\begin{bmatrix} o3 & o4 \\ \vdots & \vdots \\ u3 & u4 \end{bmatrix}$$

may be stored and made available when slice 2 is being processed. It is appreciated that in this embodiment, the kernel operations with respect elements within slice 1 that can be operated on, e.g., $$\begin{bmatrix} o1 & \cdots & o3 \\ \vdots & \ddots & \vdots \\ u1 & \cdots & u3 \end{bmatrix},$$

are operated on while other elements that are needed by slice 2, e.g., $$\begin{bmatrix} o4 \\ \vdots \\ u4 \end{bmatrix},$$

are not operated on. It is appreciated that a similar process takes place with respect to each subsequent slice, e.g., between slice 2 and slice 3, slice 3 and slice 4, etc.

In this nonlimiting example, since the kernel size is 3 and the stride value is 2, then tensors $$\begin{bmatrix} o3 & \cdots & o5 \\ \vdots & \ddots & \vdots \\ r3 & \cdots & r5 \end{bmatrix}, \begin{bmatrix} r3 & \cdots & r5 \\ \vdots & \ddots & \vdots \\ t3 & \cdots & t5 \end{bmatrix}, \begin{bmatrix} t3 & \cdots & t5 \\ u3 & \cdots & u5 \\ 0 & \cdots & 0 \end{bmatrix},$$

$$\begin{bmatrix} o5 & \cdots & o7 \\ \vdots & \ddots & \vdots \\ r5 & \cdots & r7 \end{bmatrix}, \begin{bmatrix} r5 & \cdots & r7 \\ \vdots & \ddots & \vdots \\ t5 & \cdots & t7 \end{bmatrix}, \text{and} \begin{bmatrix} t5 & \cdots & t7 \\ u5 & \cdots & u7 \\ 0 & \cdots & 0 \end{bmatrix}$$

can be processed entirely independent of other slices, e.g., slice 3, or slice 4. It is appreciated that in tensors $$\begin{bmatrix} t3 & \cdots & t5 \\ u3 & \cdots & u5 \\ 0 & \cdots & 0 \end{bmatrix} \text{and} \begin{bmatrix} t5 & \cdots & t7 \\ u5 & \cdots & u7 \\ 0 & \cdots & 0 \end{bmatrix},$$

the bottom row is empty since a 3×3 kernel is used with a stride value of 2, and as such a row of zeros is inserted for the bottom row. Moreover, it is appreciated that the tensor data $$\begin{bmatrix} o3 & o4 \\ \vdots & \vdots \\ u3 & u4 \end{bmatrix}$$

and/or the processed partial data by slice 1 on the tensor data $$\begin{bmatrix} o3 & o4 \\ \vdots & \vdots \\ u3 & u4 \end{bmatrix}$$

that has been stored is passed on to slice 2 when slice 2 is being processed. As illustrated, processing the next set of tensors, e.g., $$\begin{bmatrix} o7 & \cdots & o9 \\ \vdots & \ddots & \vdots \\ r7 & \cdots & r9 \end{bmatrix}, \begin{bmatrix} r7 & \cdots & r9 \\ \vdots & \ddots & \vdots \\ t7 & \cdots & t7 \end{bmatrix}, \text{and} \begin{bmatrix} t7 & \cdots & t9 \\ u7 & \cdots & u9 \\ 0 & \cdots & 0 \end{bmatrix},$$

requires data from two adjacent slices, i.e., slice 2 and 3. In other words, data from one slice should be passed on to its adjacent slice in order to complete its processing. In this example, tensor data $$\begin{bmatrix} o7 & o8 \\ \vdots & \vdots \\ u7 & u8 \end{bmatrix}$$

from slice 2 is needed by slice 3. As such, tensor data $$\begin{bmatrix} o7 & o8 \\ \vdots & \vdots \\ u7 & u8 \end{bmatrix}$$

may be saved in a memory component, e.g., OCMs of processing tiles of ML hardware, as shown in FIG. 1, such that when slice 3 is being processed the data needed from slice 2 becomes available. In yet another example, the tensor data $$\begin{bmatrix} o7 & o8 \\ \vdots & \vdots \\ u7 & u8 \end{bmatrix}$$

may be stored in a memory component other than OCMs of the processing tiles, e.g., DDR component that is external to the ML hardware. In some nonlimiting example, the processing tiles processing slice 2 may also process the tensor data $$\begin{bmatrix} o7 & o8 \\ \vdots & \vdots \\ u7 & u8 \end{bmatrix}$$

to obtain processed partial data (e.g., locally calculated parts) where the processed partial data is stored (e.g., in OCMs of the processing tiles, external DDR, etc.) to make it available for processing when slice 3 is being processed. Partially processing the data available in slice 2 leverages available processing elements when slice 2 is being processed to alleviate processing burden when slice 3 is being processed. In other words, the tensor data $$\begin{bmatrix} o7 & o8 \\ \vdots & \vdots \\ u7 & u8 \end{bmatrix}$$

and/or the processed partial data by slice 2 on the tensor data $$\begin{bmatrix} o7 & o8 \\ \vdots & \vdots \\ u7 & u8 \end{bmatrix}$$

may be stored and made available when slice 3 is being processed. It is appreciated that in this embodiment, the kernel operations with respect elements within slice 2 that can be operated on, e.g., $$\begin{bmatrix} o3 & \cdots & o7 \\ \vdots & \ddots & \vdots \\ u3 & \cdots & u7 \end{bmatrix},$$

are operated on while other elements that are needed by slice 3, e.g., $$\begin{bmatrix} o8 \\ \vdots \\ u8 \end{bmatrix},$$

are not operated on.

In this nonlimiting example, since the kernel size is 3 and the stride value is 2, then tensors $$\begin{bmatrix} o7 & \cdots & o9 \\ \vdots & \ddots & \vdots \\ r7 & \cdots & r9 \end{bmatrix}, \begin{bmatrix} r7 & \cdots & r9 \\ \vdots & \ddots & \vdots \\ t7 & \cdots & t9 \end{bmatrix}, \begin{bmatrix} t7 & \cdots & t9 \\ u7 & \ddots & u9 \\ 0 & \cdots & 0 \end{bmatrix}, \begin{bmatrix} o9 & \cdots & o11 \\ \vdots & \ddots & \vdots \\ r9 & \cdots & r11 \end{bmatrix},$$

$$\begin{bmatrix} r9 & \cdots & r11 \\ \vdots & \ddots & \vdots \\ t9 & \cdots & t11 \end{bmatrix}, \text{ and } \begin{bmatrix} t9 & \cdots & t11 \\ u9 & \ddots & u11 \\ 0 & \cdots & 0 \end{bmatrix}$$

can be processed entirely independent of other slices, e.g., slice 4. It is appreciated that in tensors $$\begin{bmatrix} t7 & \cdots & t9 \\ u7 & \cdots & u9 \\ 0 & \cdots & 0 \end{bmatrix} \text{ and } \begin{bmatrix} t9 & \cdots & t11 \\ u9 & \cdots & u11 \\ 0 & \cdots & 0 \end{bmatrix},$$

the bottom row is empty since a 3×3 kernel is used with a stride value of 2, and as such a row of zeros is inserted for the bottom row. Moreover, it is appreciated that the tensor data $$\begin{bmatrix} o7 & o8 \\ \vdots & \vdots \\ u7 & u8 \end{bmatrix}$$

and/or the processed partial data by slice 2 on the tensor data $$\begin{bmatrix} o7 & o8 \\ \vdots & \vdots \\ u7 & u8 \end{bmatrix}$$

that has been stored is passed on to slice 3 when slice 3 is being processed. As illustrated, processing the next set of tensors, e.g., $$\begin{bmatrix} o11 & \cdots & o13 \\ \vdots & \ddots & \vdots \\ r11 & \cdots & r13 \end{bmatrix}, \begin{bmatrix} r11 & \cdots & r13 \\ \vdots & \ddots & \vdots \\ t11 & \cdots & t13 \end{bmatrix}, \text{ and } \begin{bmatrix} t11 & \cdots & t13 \\ u11 & \cdots & u13 \\ 0 & \cdots & 0 \end{bmatrix},$$

requires data from two adjacent slices, i.e., slice 3 and 4. In other words, data from one slice should be passed on to its adjacent slice in order to complete its processing. In this example, tensor data $$\begin{bmatrix} o11 & o12 \\ \vdots & \vdots \\ u11 & u12 \end{bmatrix}$$

from slice 3 is needed by slice 4. As such, tensor data $$\begin{bmatrix} o11 & o12 \\ \vdots & \vdots \\ u11 & u12 \end{bmatrix}$$

may be saved in a memory component, e.g., OCMs of processing tiles of ML hardware, as shown in FIG. 1, such that when slice 4 is being processed the data needed from slice 3 becomes available. In yet another example, the tensor data $$\begin{bmatrix} o11 & o12 \\ \vdots & \vdots \\ u11 & u12 \end{bmatrix}$$

may be stored in a memory component other than OCMs of the processing tiles, e.g., DDR component that is external to the ML hardware. In some nonlimiting example, the processing tiles processing slice 3 may also process the tensor data $$\begin{bmatrix} o11 & o12 \\ \vdots & \vdots \\ u11 & u12 \end{bmatrix}$$

to obtain processed partial data (e.g., locally calculated parts) where the processed partial data is stored (e.g., in OCMs of the processing tiles, external DDR, etc.) to make it available for processing when slice 4 is being processed. Partially processing the data available in slice 3 leverages available processing elements when slice 3 is being processed to alleviate processing burden when slice 4 is being processed. In other words, the tensor data $$\begin{bmatrix} o11 & o12 \\ \vdots & \vdots \\ u11 & u12 \end{bmatrix}$$

and/or the processed partial data by slice 3 on the tensor data $$\begin{bmatrix} o11 & o12 \\ \vdots & \vdots \\ u11 & u12 \end{bmatrix}$$

may be stored and made available when slice 4 is being processed. It is appreciated that in this embodiment, the kernel operations with respect elements within slice 3 that can be operated on, e.g., $$\begin{bmatrix} o7 & \cdots & o11 \\ \vdots & \ddots & \vdots \\ u7 & \cdots & u11 \end{bmatrix},$$

are operated on while other elements that are needed by slice 4, e.g., $$\begin{bmatrix} o12 \\ \vdots \\ u12 \end{bmatrix},$$

are not operated on.

In this example, since slice 4 is the last slice and no other slices are present, then data stored during processing of slice 3, i.e., the tensor data $$\begin{bmatrix} o11 & o12 \\ \vdots & \vdots \\ u11 & u12 \end{bmatrix}$$

and/or the processed partial data by slice 3 on the tensor data $$\begin{bmatrix} o11 & o12 \\ \vdots & \vdots \\ u11 & u12 \end{bmatrix},$$

may be fetched and used during processing of slice 4.

Figure 12C:
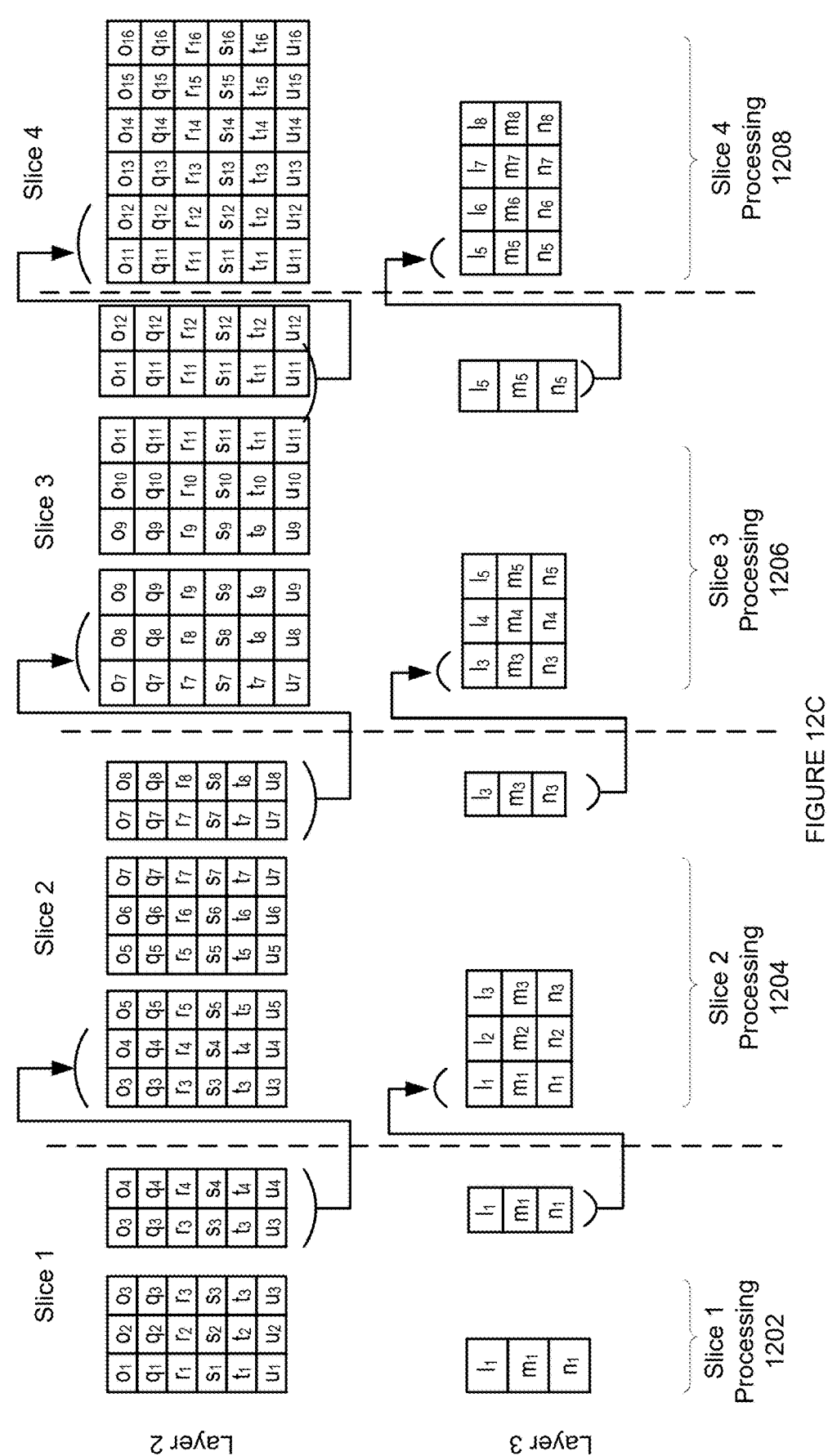
FIG. 12C shows dependency of data in two layers of a two-dimensional convolution for different slices of the image according to one aspect of the present embodiments.

Referring now to FIG. 12C, processing of an image layers 2 and 3 of a two-dimensional convolution according to some embodiments is shown. In this example, the tensor data $$\begin{bmatrix} o1 & \cdots & o3 \\ \vdots & \ddots & \vdots \\ u1 & \cdots & u3 \end{bmatrix}$$

for layer 2 is processed during slice 1 processing 1202. It is appreciated that the compiler may determine that input data $$\begin{bmatrix} p5 & \cdots & p9 \\ \vdots & \ddots & \vdots \\ p73 & \cdots & p69 \end{bmatrix}$$

from layer 1 slice 1 is not needed by layer 1 slice 2 because layer 1 slice 2 receives the intermediate tensor data $$\begin{bmatrix} o3 & o4 \\ \vdots & \vdots \\ u3 & u4 \end{bmatrix}$$

from layer 2 of slice 1 when slice 2 of layer 2 is being processed subsequent to slice 1 processing. Similarly, the tensor data $$\begin{bmatrix} l1 \\ \vdots \\ n1 \end{bmatrix},$$

for layer 3 of slice 1 is processed during slice 1 processing 1202. In some embodiments, the compiler may determine that tensor data tensor data $$\begin{bmatrix} l1 \\ \vdots \\ n1 \end{bmatrix},$$

for layer 3 of slice 1 is needed when slice 2 of layer 3 is being processed subsequent to slice 1 processing. As such, the need to store the input data $$\begin{bmatrix} p5 & \cdots & p9 \\ \vdots & \ddots & \vdots \\ p73 & \cdots & p69 \end{bmatrix}$$

from layer 1 slice 1 to be used by slice 2 is eliminated because the tensor data $$\begin{bmatrix} o3 & o4 \\ \vdots & \vdots \\ u3 & u4 \end{bmatrix}$$

for layer 2 slice 1, tensor data $$\begin{bmatrix} l1 \\ \vdots \\ n1 \end{bmatrix}$$

for layer 3 of slice 1, and/or the generated partial data from processing associated with slice 1 may be stored, e.g., in OCMs of the processing tiles of ML hardware, DDR memory external to the ML hardware, etc., for later retrieval and use when slice 2 is being processed. In other words, the tensor data $$\begin{bmatrix} o3 & o4 \\ \vdots & \vdots \\ u3 & u4 \end{bmatrix}$$

from layer 2 slice 1, the tensor data $$\begin{bmatrix} l1 \\ \vdots \\ n1 \end{bmatrix}$$

from layer 3 slice 1, and/or partial data derived therefrom is made available to slice 2 when slice 2 is being processed. Partial data may include the result of applying a partial kernel that overlaps the region on slice 1, e.g., $$\begin{bmatrix} o3 & o4 \\ \vdots & \vdots \\ u3 & u4 \end{bmatrix},$$

and which is exchanged with slice 2 which is combined with the partial results of applying the kernel on data of slice 2, e.g., $$\begin{bmatrix} o5 \\ \vdots \\ u5 \end{bmatrix}.$$

In other words, instead of performing a full summation of the weight multiplied elements of the input tensor region under the kernel, the partial sum on the data from slice 1 (exchanged from slice 1 to slice 2) is used with the partial sum on the data from slice 2 may be used to obtain the full summation. It is appreciated that this process is repeated for each slice.

Slice 2 processing 1204 may be performed based on input data $$\begin{bmatrix} p9 & \cdots & p17 \\ \vdots & \ddots & \vdots \\ p69 & \cdots & p61 \end{bmatrix}$$

from layer 1, tensor data $$\begin{bmatrix} o3 & o4 \\ \vdots & \vdots \\ u3 & u4 \end{bmatrix} \text{ and } \begin{bmatrix} l1 \\ \vdots \\ n1 \end{bmatrix}$$

from slice 1, and intermediate tensor data $$\begin{bmatrix} o5 & \cdots & o8 \\ \vdots & \ddots & \vdots \\ u5 & \cdots & u8 \end{bmatrix}$$

for layer 2 and tensor data $$\begin{bmatrix} l2 & \cdots & l3 \\ \vdots & \ddots & \vdots \\ n2 & \cdots & n3 \end{bmatrix}$$

from layer 3 are generated. Similar to slice 1, the compiler may determine that the tensor data $$\begin{bmatrix} o7 & o8 \\ \vdots & \vdots \\ u7 & u8 \end{bmatrix}$$

from layer 2 slice 2, and tensor data $$\begin{bmatrix} l3 \\ \vdots \\ n3 \end{bmatrix}$$

from layer 3 slice 2 are needed when slice 3 is being processed. As such, the tensor data $$\begin{bmatrix} o7 & o8 \\ \vdots & \vdots \\ u7 & u8 \end{bmatrix},$$

and the tensor data $$\begin{bmatrix} l3 \\ \vdots \\ n3 \end{bmatrix}$$

and/or the generated partial data from processing in slice 2 may be stored, e.g., in OCMs of the processing tiles of ML hardware, DDR memory external to the ML hardware, etc., for later retrieval and use when slice 3 is being processed. In other words, the tensor data $$\begin{bmatrix} o7 & o8 \\ \vdots & \vdots \\ u7 & u8 \end{bmatrix},$$

the tensor data $$\begin{bmatrix} l3 \\ \vdots \\ n3 \end{bmatrix},$$

and/or partial data derived therefrom is made available from slice 2 to slice 3 when slice 3 is being processed.

Slice 3 processing 1206 may be performed based on input data $$\begin{bmatrix} p17 & \cdots & p25 \\ \vdots & \ddots & \vdots \\ p61 & \cdots & p53 \end{bmatrix}$$

from layer 1, and tensor data $$\begin{bmatrix} o7 & o8 \\ \vdots & \vdots \\ u7 & u8 \end{bmatrix} \text{ and } \begin{bmatrix} l3 \\ \vdots \\ n3 \end{bmatrix}$$

from slice 2, and intermediate tensor data $$\begin{bmatrix} o9 & \dots & o12 \\ \vdots & \ddots & \vdots \\ u9 & \dots & u12 \end{bmatrix}$$

for layer 2 and tensor data $$\begin{bmatrix} l4 & \dots & l5 \\ \vdots & \ddots & \vdots \\ n4 & \dots & n5 \end{bmatrix}$$

for layer 3 are generated. Similar to slice 2, the compiler may determine that the tensor data $$\begin{bmatrix} o11 & o12 \\ \vdots & \vdots \\ u11 & u12 \end{bmatrix}$$

from layer 2 slice 3, and tensor data $$\begin{bmatrix} l5 \\ \vdots \\ n5 \end{bmatrix}$$

from layer 3 slice 3, are needed when slice 4 is being processed. As such, the tensor data $$\begin{bmatrix} o11 & o12 \\ \vdots & \vdots \\ u11 & u12 \end{bmatrix}$$

from layer 2 slice 3, and the tensor data $$\begin{bmatrix} l5 \\ \vdots \\ n5 \end{bmatrix}$$

from layer 3 slice 3 and/or the generated partial data from processing slice 3 may be stored, e.g., in OCMs of the processing tiles of ML hardware, DDR memory external to the ML hardware, etc., for later retrieval and use when slice 4 is being processed. In other words, the tensor data $$\begin{bmatrix} o11 & o12 \\ \vdots & \vdots \\ u11 & u12 \end{bmatrix}$$

the tensor data $$\begin{bmatrix} l5 \\ \vdots \\ n5 \end{bmatrix},$$

and/or partial data derived therefrom is made available from slice 3 to slice 4 when slice 4 is being processed. It is appreciated that slice 4 processing 1208 may be carried away based on the input data $$\begin{bmatrix} p25 & \dots & p33 \\ \vdots & \ddots & \vdots \\ p53 & \dots & p45 \end{bmatrix}$$

from layer 1, and tensor data $$\begin{bmatrix} o11 & o12 \\ \vdots & \vdots \\ u11 & u12 \end{bmatrix} \text{ and } \begin{bmatrix} l5 \\ \vdots \\ n5 \end{bmatrix}$$

from slice 3, and intermediate tensor data $$\begin{bmatrix} o13 & \dots & o18 \\ \vdots & \ddots & \vdots \\ u13 & \dots & u18 \end{bmatrix}$$

for layer 2 and tensor data $$\begin{bmatrix} l6 & \dots & l8 \\ \vdots & \ddots & \vdots \\ n6 & \dots & n8 \end{bmatrix}$$

for layer 3 are generated.

It is appreciated that as illustrated in this nonlimiting example, one or more slices (with one or more layers) may include at least a data portion that can be processed independent of other slices. For example, tensor data $$\begin{bmatrix} o1 & \dots & o3 \\ \vdots & \ddots & \vdots \\ u1 & \dots & u3 \end{bmatrix}$$

from slice 1, tensor data $$\begin{bmatrix} o5 & \dots & o7 \\ \vdots & \ddots & \vdots \\ u5 & \dots & u7 \end{bmatrix}$$

from slice 2, tensor data $$\begin{bmatrix} o9 & \dots & o11 \\ \vdots & \ddots & \vdots \\ u9 & \dots & u11 \end{bmatrix}$$

from slice 3, and/or tensor data $$\begin{bmatrix} o13 & \dots & o16 \\ \vdots & \ddots & \vdots \\ u13 & \dots & u16 \end{bmatrix}$$

from slice 4 have no dependency on one another and may be processed independent from one another, e.g., parallel processing, sequentially, sequential and in any chronological ordering, etc. Any portion of the data having dependency from another slice may be processed in a serial fashion, as described above.

It is appreciated that the slicing approach, as described above, has been described with respect to width dimension for illustrative purposes only and should not be construed as limiting the scope of the embodiments. For example, a similar approach may be used for height dimensions, etc., which results in a sweep like algorithm starting at a corner and proceeding in a diagonal direction. Moreover, the described approach above with respect to a two-dimensional convolution is for illustrative purposes only and should not be construed as limiting the scope of the embodiments. For example, a similar approach may be used for a one-dimensional convolution, three-dimensional convolution, etc. With this approach the cone of influence is not getting larger, rather stays constant which eliminates the additional computations.

Referring now to FIGS. 13A-B, a flowchart of an example of a process for partitioning an image with reduced computations according to one aspect of the present embodiments is shown. At step 1302 an image is received as a first convolutional layer in a CNN model, as described above. At step 1304, the image is divided into a first slice and a second slice associated with the first convolutional layer, as described in FIGS. 11A-11D. At step 1306, a first tensor data associated with a second convolutional layer for the first slice using a kernel with associated weights and using a stride value is generated, as described in FIGS. 12A-C and FIG. 2C. At step 1308, a second tensor data associated with a third convolutional layer for the first slice using the kernel with associated weights and using the stride value is generated, as described in FIGS. 12A-12C and FIG. 2D. At step 1310, the first tensor data associated with the second convolutional layer is divided into a first portion and a second portion, wherein the second portion of the first tensor data is needed by the second convolutional layer of the second slice to complement partial tensor data generated by the second slice, as described in FIG. 12C. At step 1312, the second tensor data associated with the third convolutional layer is divided into a first portion and a second portion, wherein the second portion of the second tensor data is needed by the third convolutional layer of the second slice to complement partial tensor data generated by the second slice, as described in FIG. 12C. At step 1314, the first convolutional layer of the first slice, the second convolutional layer, and the third convolutional layer are processed using a subset of processing tiles from a plurality of processing tiles, as described in FIGS. 11A-11D and 12C. At step 1316, the second portion of the first tensor data and the second portion of the second tensor data generated by the first slice are stored in a memory component, e.g., OCM or external DDR, as described above. At step 1318, a first tensor data associated with the second convolutional layer for the second slice using the kernel with associated weights and using the stride value is generated, as described in FIGS. 12A-C and FIG. 2C. At step 1320, a second tensor data associated with the third convolutional layer for the second slice using the kernel with associated weights and using the stride value is generated, as described in FIGS. 12A-12C and FIG. 2D. In some embodiments, the subset of processing tiles is the same as the another subset of processing tiles of the plurality of processing tiles that process the second slice. At step 1322, partial tensor data in the second convolutional layer and the third convolutional layer that are generated by the second slice are complemented with the second portion of the first tensor data and the second portion of the second tensor data generated by the first slice, as described above, e.g., FIG. 12C.

It is appreciated that the subset of processing tiles may or may not be the same as the another subset of processing tiles of the plurality of processing tiles. It is appreciated that the embodiments have been described with respect to CNN and convolutional layers. However, the embodiments should not be construed as limited to convolutional layers. For example, a similar process may be applied for pooling layer, e.g., maxpool, average pool, convolution transpose, etc.

It is appreciated that in some embodiments, processing the second subset of data from the first slice occurs prior to the processing the first subset of data associated with the first slice. In some embodiments, data in the second slice that includes the first convolutional layer, the second convolutional layer, and the third convolutional layer includes an independent portion data, wherein the independent portion data has no dependency on data from the first slice. As such, the independent portion data may be processed independently, e.g., in parallel, with the first set of data from the first slice.

It is appreciated that embodiments described in FIGS. 2A-10 eliminate dependency between slices of an image while embodiments described in FIGS. 11A-13B allow dependency between slices of an image while reducing the amount of processing (by not causing overlap between slices). However, it is appreciated that some embodiments may utilize a combination of the two. For example, an image may be partitioned into two areas. The first area may be further sliced in accordance with the process as described in FIGS. 2A-10 while the second area may be sliced in accordance with the process as described in FIGS. 11A-13B or vice versa. It is appreciated that in some embodiments, the lower layers that use smaller tensor sizes in heigh/width (with increased computation overhead) may utilize the process as described in FIGS. 11A-13B to reduce the computation overhead while the first layers with larger tensor sizes use the process as described in FIGS. 2A-10 to eliminate dependency between the slices to enable parallel processing. In some embodiments, a first few layers may be processed in accordance with the process as described in FIGS. 2A-10 followed by the next few layers processed as described in FIGS. 11A-13B. As such, the cone of influence is determined by the last layer that is processed in accordance with the process in FIGS. 2A-10 and then the process as described in FIGS. 11A-13B start at the left most slice identifying what can locally be processed and what needs to be provided to the next slice.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A compiler implemented method, comprising:

receiving an image at a first convolutional layer in a convolutional neural network (CNN);

dividing the image into a first slice and a second slice associated with the first convolutional layer;

generating a first tensor data associated with a second convolutional layer for the first slice using a kernel with associated weights and using a stride value;

generating a second tensor data associated with a third convolutional layer for the first slice using the kernel with associated weights and using the stride value;

dividing the first tensor data associated with the second convolutional layer into a first portion and a second portion, wherein the second portion of the first tensor data is needed by the second convolutional layer of the second slice to complement partial tensor data generated by the second slice;

dividing the second tensor data associated with the third convolutional layer into a first portion and a second portion, wherein the second portion of the second tensor data is needed by the third convolutional layer of the second slice to complement partial tensor data generated by the second slice;

processing the first convolutional layer of the first slice, the second convolutional layer of the first slice, and the third convolutional layer of the first slice using a subset of processing tiles from a plurality of processing tiles; and storing the second portion of the first tensor data and the second portion of the second tensor data generated by the first slice in a memory component.

2. The compiler implemented method of claim 1, wherein the method further comprises:

generating a first tensor data associated with the second convolutional layer for the second slice using the kernel with associated weights and using the stride value; and generating a second tensor data associated with the third convolutional layer for the second slice using the kernel with associated weights and using the stride value.

3. The compiler implemented method of claim 2 further comprising complementing partial tensor data in the second convolutional layer and the third convolutional layer that are generated by the second slice with the second portion of the first tensor data and the second portion of the second tensor data generated by the first slice.

4. The compiler implemented method of claim 2, wherein a portion of tensor data being generated in the second slice is generated independent of the first tensor data of the first slice and further independent of the second tensor data of the first slice.

5. The compiler implemented method of claim 4, wherein another portion of the tensor data being generated in the second slice is generated subsequent to the first tensor data of the first slice and further independent of the second tensor data of the first slice.

6. The compiler implemented method of claim 1, wherein the subset of processing tiles from the plurality of processing tiles is the same as another subset of processing tiles from the plurality of processing tiles that process the second slice.

7. The compiler implemented method of claim 1, wherein the memory component is an on-chip memory (OCM) within the plurality of processing tiles.

8. The compiler implemented method of claim 1, wherein the memory component is a double data rate (DDR) memory external to the plurality of processing tiles.

9. The compiler implemented method of claim 1, wherein data in the second slice that includes the first convolutional layer, the second convolutional layer, and the third convolutional layer includes an independent portion data, wherein the independent portion data has no dependency on data from the first slice.

10. The compiler implemented method of claim 9, wherein the independent portion data is processed in parallel with the generating the first and the second tensor data for the first slice.

11. A system comprising:

a means for receiving an image as a first convolution layer in a convolutional neural network (CNN);

a means for dividing the image into a first slice and a second slice associated with the first convolutional layer;

a means for generating a first tensor data associated with a second convolutional layer for the first slice using a kernel with associated weights and using a stride value;

a means for generating a second tensor data associated with a third convolutional layer for the first slice using the kernel with associated weights and using the stride value;

a means for dividing the first tensor data associated with the second convolutional layer into a first portion and a second portion, wherein the second portion of the first tensor data is needed by the second convolutional layer of the second slice to complement partial tensor data generated by the second slice;

a means for dividing the second tensor data associated with the third convolutional layer into a first portion and a second portion, wherein the second portion of the second tensor data is needed by the third convolutional layer of the second slice to complement partial tensor data generated by the second slice;

a means for processing the first convolutional layer of the first slice, the second convolutional layer, and the third convolutional layer using a subset of processing tiles from a plurality of processing tiles; and a means for storing the second portion of the first tensor data and the second portion of the second tensor data generated by the first slice in a memory component.

12. The system of claim 11 further comprising:

means for generating a first tensor data associated with the second convolutional layer for the second slice using the kernel with associated weights and using the stride value; and means for generating a second tensor data associated with the third convolutional layer for the second slice using the kernel with associated weights and using the stride value.

13. The system of claim 12 further comprising:

means for complementing partial tensor data in the second convolutional layer and the third convolutional layer that are generated by the second slice with the second portion of the first tensor data and the second portion of the second tensor data generated by the first slice.

14. The system of claim 12, wherein a portion of tensor data being generated in the second slice is generated independent of the first tensor data of the first slice and further independent of the second tensor data of the first slice.

15. The system of claim 14, wherein another portion of the tensor data being generated in the second slice is generated subsequent to the first tensor data of the first slice and further independent of the second tensor data of the first slice.

16. The system of claim 11, wherein the subset of processing tiles from the plurality of processing tiles is the same as the another subset of processing tiles from the plurality of processing tiles.

17. The system of claim 11, wherein the memory component is an on-chip memory (OCM) within the plurality of processing tiles.

18. The system of claim 11, wherein the memory component is a double data rate (DDR) memory external to the plurality of processing tiles.

19. The system of claim 11, wherein data in the second slice that includes the first convolutional layer, the second convolutional layer, and the third convolutional layer includes an independent portion data, wherein the independent portion data has no dependency on data from the first slice.

20. The system of claim 19, wherein the independent portion data is processed in parallel with the generating the first and the second tensor data for the first slice.

* * * * *